(12) United States Patent
Gheorghiu et al.

(10) Patent No.: US 11,509,447 B2
(45) Date of Patent: Nov. 22, 2022

(54) ENHANCED CARRIER AGGREGATION MANAGEMENT

(71) Applicant: QUALCOMM Incorporated, San Diego, CA (US)

(72) Inventors: Valentin Alexandru Gheorghiu, Tokyo (JP); Peter Gaal, San Diego, CA (US); Timo Ville Vintola, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/535,599

(22) Filed: Aug. 8, 2019

(65) Prior Publication Data

US 2020/0052869 A1 Feb. 13, 2020

Related U.S. Application Data

(60) Provisional application No. 62/717,392, filed on Aug. 10, 2018.

(51) Int. Cl.
*H04L 5/00* (2006.01)
*H04W 16/14* (2009.01)
*H04W 72/04* (2009.01)

(52) U.S. Cl.
CPC ............ *H04L 5/0098* (2013.01); *H04L 5/001* (2013.01); *H04L 5/005* (2013.01); *H04L 5/0035* (2013.01); *H04W 16/14* (2013.01); *H04W 72/0453* (2013.01)

(58) Field of Classification Search
CPC ....... H04L 5/0098; H04L 5/005; H04L 5/001; H04L 5/0035; H04W 72/0453; H04W 16/14

USPC ......................................................... 370/329
See application file for complete search history.

(56) References Cited

U.S. PATENT DOCUMENTS

| | | | | |
|---|---|---|---|---|
| 10,299,251 | B2* | 5/2019 | Kwon | ............... H04W 28/06 |
| 2010/0296488 | A1* | 11/2010 | Kuo | ................. H04L 27/0006 370/332 |
| 2010/0322175 | A1* | 12/2010 | Chen | ................. H04W 72/0453 370/329 |
| 2011/0105107 | A1* | 5/2011 | Kwon | ............... H04W 72/0406 455/422.1 |
| 2012/0195292 | A1* | 8/2012 | Ko | ........................ H04L 1/0027 370/336 |

(Continued)

OTHER PUBLICATIONS

International Search Report and Written Opinion—PCT/US2019/045940—ISA/EPO—dated Nov. 7, 2019.

*Primary Examiner* — Faisal Choudhury
(74) *Attorney, Agent, or Firm* — Holland & Hart LLP

(57) ABSTRACT

Methods, systems, and devices for enhanced carrier aggregation techniques described. For example, component carrier groups including multiple component carriers may be configured. In some cases, each component carrier group may be configured to include $2^n$ component carriers. Also, component carriers may be managed on a per component carrier group basis. In some cases, a single management message may be used to communicate management information for a component carrier group. Similarly, a single control message may be used to communicate control information, such as physical layer parameters, for a component carrier group.

28 Claims, 16 Drawing Sheets

(56) References Cited

U.S. PATENT DOCUMENTS

| | | | |
|---|---|---|---|
| 2013/0028204 A1* | 1/2013 | Dinan | H04L 5/0098 370/329 |
| 2013/0058233 A1* | 3/2013 | Kim | H04W 24/08 370/252 |
| 2013/0155868 A1* | 6/2013 | Seo | H03M 13/3723 370/241 |
| 2014/0044085 A1* | 2/2014 | Hong | H04L 5/0037 370/329 |
| 2016/0073421 A1* | 3/2016 | Cui | H04L 5/0057 370/329 |
| 2016/0100382 A1* | 4/2016 | He | H04L 5/001 370/329 |
| 2016/0323865 A1 | 11/2016 | Kwon et al. | |
| 2020/0120701 A1* | 4/2020 | Peng | H04W 72/042 |

\* cited by examiner

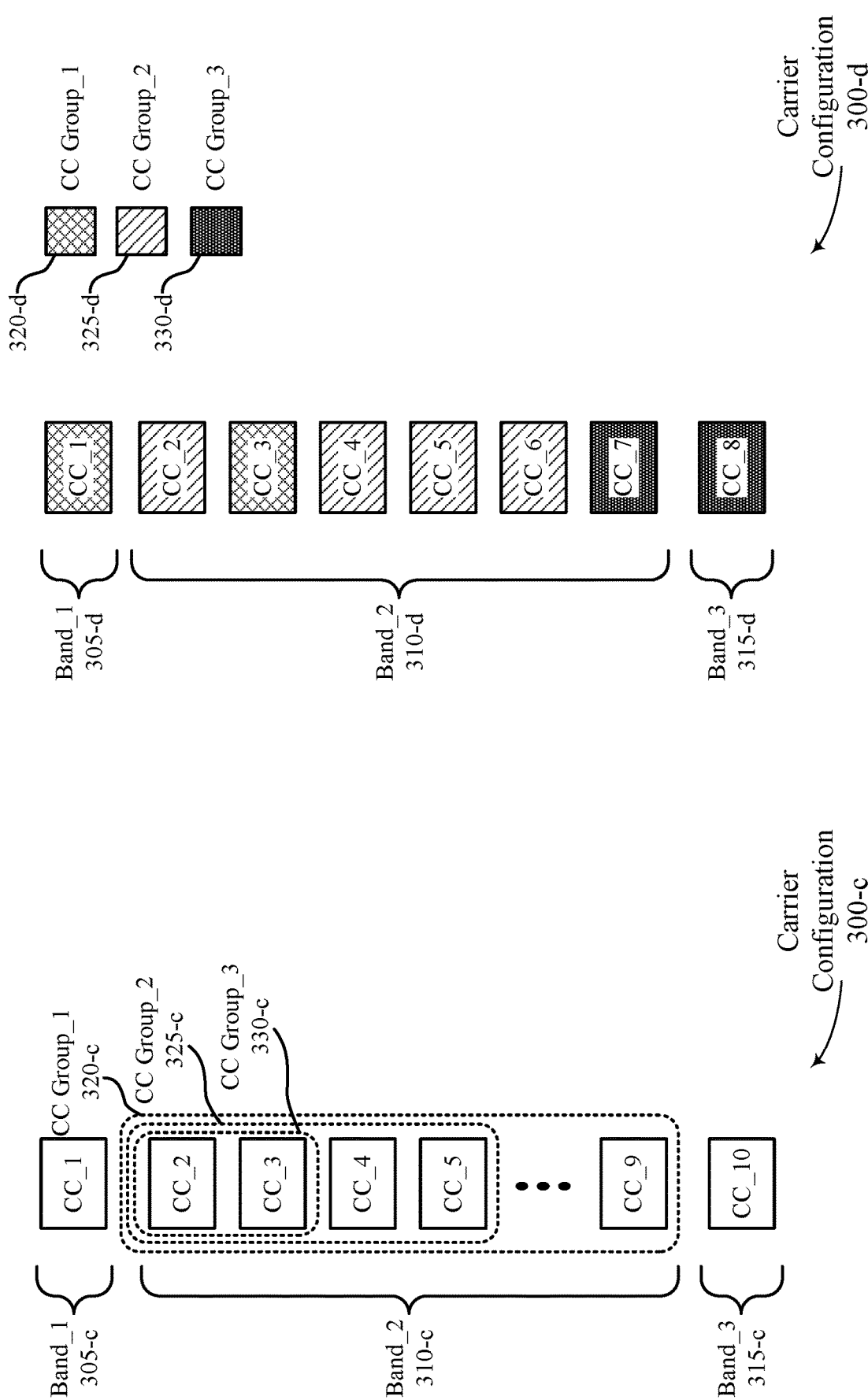

ENHANCED CARRIER AGGREGATION MANAGEMENT

CROSS REFERENCE

The present application for patent claims the benefit of U.S. Provisional Patent Application No. 62/717,392 by GHEORGHIU et al., entitled "ENHANCED CARRIER AGGREGATION MANAGEMENT," filed Aug. 10, 2018, assigned to the assignee hereof, and expressly incorporated herein.

BACKGROUND

The following relates generally to wireless communications, and more specifically to enhanced carrier aggregation (CA) management.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some cases, base stations and UEs may communicate with one another over multiple component carriers—using a technique which may be referred to as CA. As the number of component carriers included in a CA communication increases, the number of component carrier combinations and the amount of signaling overhead may also increase.

SUMMARY

Enhanced carrier aggregation (CA) techniques may be employed to reduce the amount of component carrier (CC) combinations supported by a user equipment (UE) and the amount of signaling overhead associated with maintaining different combinations of CCs. For example, CC groups including multiple CCs may be configured. In some cases, each CC group may be configured to include $2^n$ CCs. Also, CCs may be managed on a per CC group basis. In some cases, a management message may be used to communicate management information, such as a CC configuration or the activation or deactivation of a CC group. Similarly, a control message may be used to communicate control information, such as physical layer parameters, for a CC group.

A method of wireless communication at a UE is described. The method may include receiving, from a base station, an activation message indicating an activation of a first CC group for CA communications between the UE and the base station, the first CC group including a first set of CCs, receiving, from the base station, a first set of physical layer parameters for the first CC group, the first set of physical layer parameters applicable to each of the first set of CCs in the first CC group, and communicating with the base station over the first set of CCs according to the first set of physical layer parameters.

An apparatus for wireless communication at a UE is described. The apparatus may include a processor, memory in electronic communication with the processor, and instructions stored in the memory. The instructions may be executable by the processor to cause the apparatus to receive, from a base station, an activation message indicating an activation of a first CC group for CA communications between the UE and the base station, the first CC group including a first set of CCs, receive, from the base station, a first set of physical layer parameters for the first CC group, the first set of physical layer parameters applicable to each of the first set of CCs in the first CC group, and communicate with the base station over the first set of CCs according to the first set of physical layer parameters.

Another apparatus for wireless communication at a UE is described. The apparatus may include means for receiving, from a base station, an activation message indicating an activation of a first CC group for CA communications between the UE and the base station, the first CC group including a first set of CCs, receiving, from the base station, a first set of physical layer parameters for the first CC group, the first set of physical layer parameters applicable to each of the first set of CCs in the first CC group, and communicating with the base station over the first set of CCs according to the first set of physical layer parameters.

A non-transitory computer-readable medium storing code for wireless communication at a UE is described. The code may include instructions executable by a processor to receive, from a base station, an activation message indicating an activation of a first CC group for CA communications between the UE and the base station, the first CC group including a first set of CCs, receive, from the base station, a first set of physical layer parameters for the first CC group, the first set of physical layer parameters applicable to each of the first set of CCs in the first CC group, and communicate with the base station over the first set of CCs according to the first set of physical layer parameters.

Some examples of the method, apparatuses, and non-transitory computer-readable medium described herein may further include operations, features, means, or instructions for receiving, from the base station, a configuration message indicating a configuration of a set of CCs for CA, where the set of CCs includes the first set of CCs and a second set of CCs, and where the configuration message further indicates an assignment of the first set of CCs to the first CC group.

In some examples of the method, apparatuses, and non-transitory computer-readable medium described herein, the configuration message includes an indication identifying that the first set of CCs may be assigned to the first CC group.

In some examples of the method, apparatuses, and non-transitory computer-readable medium described herein, the first set of physical layer parameters includes a transmission mode (TM) parameter, a K0 delay parameter, a K1 delay parameter, a K2 delay parameter, a K3 delay parameter, or a bandwidth part (BWP) configuration parameter, or any combination thereof.

In some examples of the method, apparatuses, and non-transitory computer-readable medium described herein, the first set of CCs and the second set of CCs may be located within a first frequency band or the first set of CCs may be located within the first frequency band and the second set of CCs may be located in at least one other frequency band.

Some examples of the method, apparatuses, and non-transitory computer-readable medium described herein may further include operations, features, means, or instructions for receiving, from the base station, a configuration message indicating an assignment of a subset of the first set of CCs to a second CC group and receiving, from the base station, a second activation message activating the second CC group, where the communicating includes communicating with the base station over the subset of the first set of CCs based on receiving the second activation message.

Some examples of the method, apparatuses, and non-transitory computer-readable medium described herein may further include operations, features, means, or instructions for receiving, from the base station, a configuration message indicating an assignment of a second set of CCs to a second CC group and receiving, from the base station, a second activation message activating the second CC group, where the communicating includes communicating with the base station over the second set of CCs based on receiving the second activation message.

Some examples of the method, apparatuses, and non-transitory computer-readable medium described herein may further include operations, features, means, or instructions for receiving, from the base station, a second set of physical layer parameters for the second CC group, the second set of physical layer parameters applicable to each of the second set of CCs in the second CC group, where the communicating includes communicating with the base station over the second set of CCs according to the second set of physical layer parameters.

Some examples of the method, apparatuses, and non-transitory computer-readable medium described herein may further include operations, features, means, or instructions for determining that the first set of CCs may be assigned to the first CC group based on a respective index of each of the first set of CCs.

In some examples of the method, apparatuses, and non-transitory computer-readable medium described herein, a configuration message includes an indication of at least one index of the first set of CCs.

Some examples of the method, apparatuses, and non-transitory computer-readable medium described herein may further include operations, features, means, or instructions for measuring channel conditions for the first CC group.

In some examples of the method, apparatuses, and non-transitory computer-readable medium described herein, the first CC group is selected from a set of supported groups that is based at least in part on a configured number of CCs, wherein each group of the set of supported groups comprises $2^n$ component carriers, n being an integer greater than zero.

Some examples of the method, apparatuses, and non-transitory computer-readable medium described herein may further include operations, features, means, or instructions for receiving, from the base station, a reconfiguration message and reconfiguring radio resource information for the first set of CCs based on receiving the reconfiguration message.

In some examples of the method, apparatuses, and non-transitory computer-readable medium described herein, reconfiguring the radio resource information may include operations, features, means, or instructions for adding a first CC to the first CC group or removing a second CC from the first CC group.

In some examples of the method, apparatuses, and non-transitory computer-readable medium described herein, the first set of CCs includes $2^n$ CCs, n being an integer greater than zero.

A method of wireless communication at a base station is described. The method may include transmitting, to a UE, an activation message indicating an activation of a first CC group for CA communications between the UE and the base station, transmitting, to the UE, a first set of physical layer parameters for the first CC group, the first set of physical layer parameters applicable to each of the first set of CCs in the first CC group, and communicating with the UE over the first set of CCs according to the first set of physical layer parameters.

An apparatus for wireless communication at a base station is described. The apparatus may include a processor, memory in electronic communication with the processor, and instructions stored in the memory. The instructions may be executable by the processor to cause the apparatus to transmit, to a UE, an activation message indicating an activation of a first CC group for CA communications between the UE and the base station, transmit, to the UE, a first set of physical layer parameters for the first CC group, the first set of physical layer parameters applicable to each of the first set of CCs in the first CC group, and communicate with the UE over the first set of CCs according to the first set of physical layer parameters.

Another apparatus for wireless communication at a base station is described. The apparatus may include means for transmitting, to a UE, an activation message indicating an activation of a first CC group for CA communications between the UE and the base station, transmitting, to the UE, a first set of physical layer parameters for the first CC group, the first set of physical layer parameters applicable to each of the first set of CCs in the first CC group, and communicating with the UE over the first set of CCs according to the first set of physical layer parameters.

A non-transitory computer-readable medium storing code for wireless communication at a base station is described. The code may include instructions executable by a processor to transmit, to a UE, an activation message indicating an activation of a first CC group for CA communications between the UE and the base station, transmit, to the UE, a first set of physical layer parameters for the first CC group, the first set of physical layer parameters applicable to each of the first set of CCs in the first CC group, and communicate with the UE over the first set of CCs according to the first set of physical layer parameters.

Some examples of the method, apparatuses, and non-transitory computer-readable medium described herein may further include operations, features, means, or instructions for configuring a set of CCs for CA communications, the set of CCs including the first set of CCs and a second set of CCs, where the configuring includes transmitting a configuration message indicating the set of CCs and an assignment of the first set of CCs to the first CC group.

In some examples of the method, apparatuses, and non-transitory computer-readable medium described herein, a second set of CCs may be assigned to a second CC group, and where the configuration message indicates an assignment of the second set of CCs to the second CC group.

Some examples of the method, apparatuses, and non-transitory computer-readable medium described herein may further include operations, features, means, or instructions for transmitting, to the UE, a second activation message indicating an activation of the second CC group, where the communicating includes communicating with the UE over the second set of CCs based on transmitting the second activation message.

Some examples of the method, apparatuses, and non-transitory computer-readable medium described herein may further include operations, features, means, or instructions for transmitting, to the UE, a second set of physical layer parameters for the second CC group, the second set of physical layer parameters applicable to each of the second set of CCs in the second CC group, where the communicating includes communicating with the UE over the second set of CCs according to the second set of physical layer parameters.

In some examples of the method, apparatuses, and non-transitory computer-readable medium described herein, the second set of CCs includes $2^m$ CCs, m being an integer greater than zero.

In some examples of the method, apparatuses, and non-transitory computer-readable medium described herein, the first set of CCs and the second set of CCs may be located within a first frequency band.

In some examples of the method, apparatuses, and non-transitory computer-readable medium described herein, the first set of CCs may be located within a first frequency band and the second set of CCs may be located in at least one other frequency band.

Some examples of the method, apparatuses, and non-transitory computer-readable medium described herein may further include operations, features, means, or instructions for assigning the first set of CCs to the first CC group and refraining from assigning the second set of CCs to a CC group.

In some examples of the method, apparatuses, and non-transitory computer-readable medium described herein, the set of CCs may be associated with a set of CC groups, each CC group including $2^n$ CCs of the set of CCs, n being an integer greater than zero.

Some examples of the method, apparatuses, and non-transitory computer-readable medium described herein may further include operations, features, means, or instructions for measuring channel conditions for the first CC group.

Some examples of the method, apparatuses, and non-transitory computer-readable medium described herein may further include operations, features, means, or instructions for transmitting, to the UE, a reconfiguration message for the first CC group and reconfiguring radio resource information for the first set of CCs.

In some examples of the method, apparatuses, and non-transitory computer-readable medium described herein, each CC of the first set of CCs may be associated with an index, where each CC of the first set of CCs may be assigned to the first CC group based on a respective index, and where the activation message includes an indication of at least one index of the first set of CCs.

In some examples of the method, apparatuses, and non-transitory computer-readable medium described herein, the first set of CCs includes $2^n$ CCs, n being an integer greater than zero.

In some examples of the method, apparatuses, and non-transitory computer-readable medium described herein, a subset of the first set of CCs may be assigned to a second CC group, where a configuration message indicates an assignment of the subset of the first set of CCs to the second CC group.

Some examples of the method, apparatuses, and non-transitory computer-readable medium described herein may further include operations, features, means, or instructions for transmitting, to the UE, a second activation message activating the second CC group, where the communicating includes communicating with the UE over the subset of the first set of CCs based on transmitting the second activation message.

BRIEF DESCRIPTION OF THE DRAWINGS

FIG. 3A to 3D illustrate aspects of component carrier configurations that support enhanced CA management in accordance with various aspects of the present disclosure.

DETAILED DESCRIPTION

Figure 1:
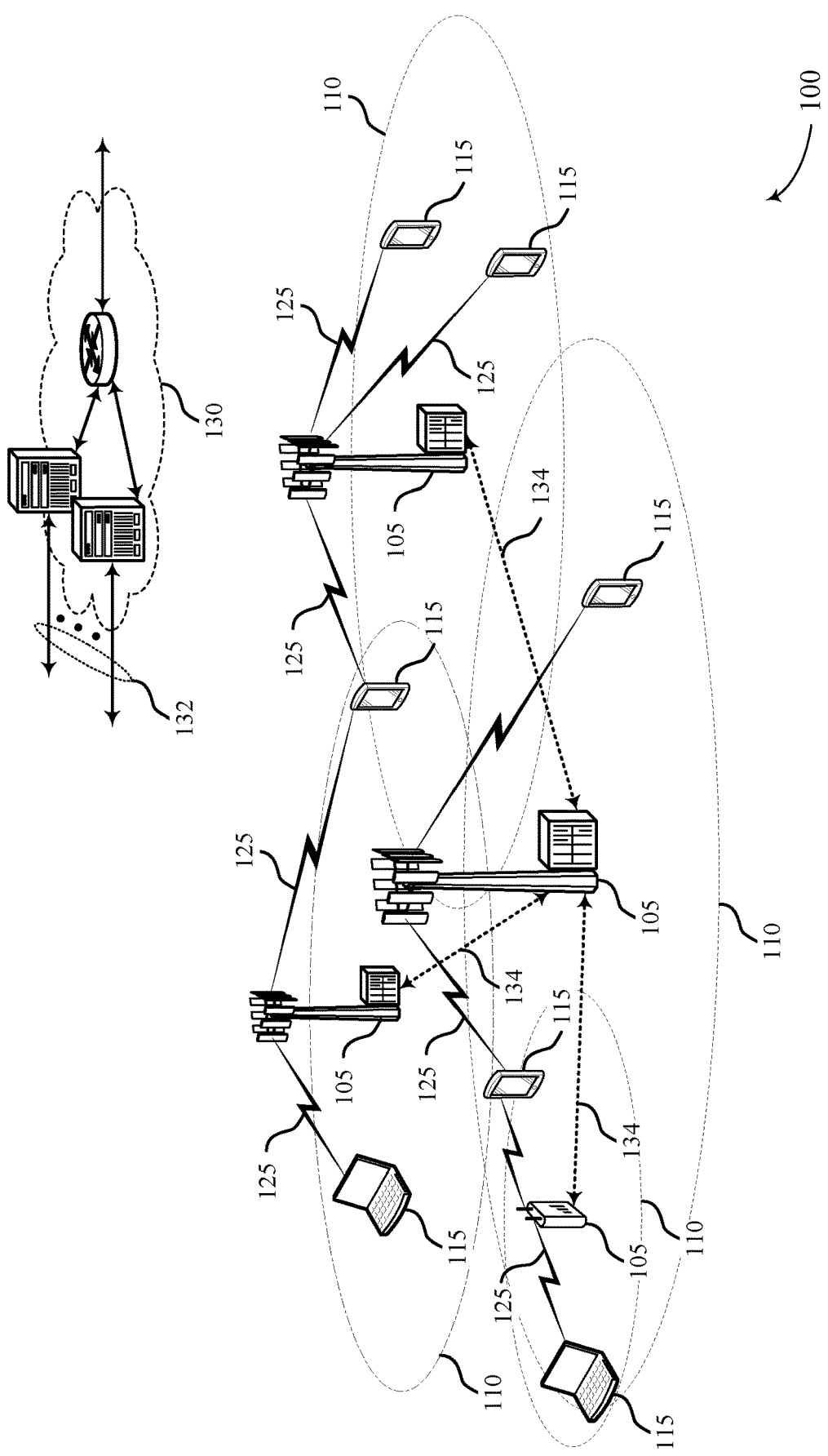
FIG. 1 illustrates aspects of a wireless communications system that supports enhanced carrier aggregation (CA) management in accordance with various aspects of the present disclosure.

A component carrier—which may also be referred to as a primary cell (PCell) or a secondary cell (SCell)—may be used to communicate information between wireless devices. To enable communications over a component carrier (CC), management and control signaling (e.g., radio resource control (RRC) and physical (PHY) layer signaling) may be communicated between wireless devices. In some cases, multiple CCs may be configured for concurrent communications between wireless devices—using a technique which may be referred to as carrier aggregation (CA).

In some examples, different combinations of the configured CCs may be used for communications between the wireless devices—e.g., based on channel conditions. In some cases, to enable communications over different CC combinations, wireless devices may support each possible CC combination. For example, for five CCs, a wireless device may be prepared to communicate over 31 different CC combinations—SUM(5-choose-5, 5-choose-4, 5-choose-3, 5-choose-2, 5-choose-1). As the number of configured CCs increases, the number of possible CC combinations increases disproportionately, quickly reaching thousands of CC combinations. Continuing to support each of the CC combinations as the number of aggregated CCs increases may significantly increase setup overhead and the complexity of CA communications.

To reduce setup overhead and the number of supported CC combinations, CC groups including multiple CCs may be configured.

For example, the number of supported CC combinations may be reduced by grouping CCs in a limited number of CC groups—e.g., a number of CC groups may be less than the number of CC combinations. Grouping CCs may include constructing CC groups including $2^n$ CCs, where n is an integer greater than or equal to zero. In some cases, CC grouping may be performed only for intra-band CCs.

The grouping of CCs may be accomplished using explicit and/or implicit techniques. For implicit operation, for example, CCs may be grouped according to indices associated with the CCs. While for explicit operation, for example, CCs may be grouped by a wireless network (e.g., based on channel conditions, a frequency location of the CCs, and the like). In some cases, a configuration message may be used to indicate, either explicitly or implicitly, the assignment of CCs to different CC groups.

In some examples, management and control information is individually signaled for each CC in a set of aggregated CCs. But sending separate management and control signaling per CC may increase the amount of signaling overhead and decrease the throughput of a wireless communication system. Also, as the number of configured CCs increases, the amount of management and control signaling also increases. Continuing to send separate management and control signaling per CC as the number of aggregated CCs increases may significantly increase signaling overhead, decreasing the relative throughput of CA communications.

To reduce the amount of management and control signaling for CA communications, CCs may be managed on a CC group basis.

As discussed above and herein, CCs may be grouped into CC groups. In some cases, once CCs have been grouped together, the group of CCs may effectively be treated as a single CC. Accordingly, a single set of management and control signaling that is applicable to each CC in a CC group may be communicated for a CC group.

In some examples, a management message may be used to communicate management information, such as a configuration message, an activation message, or a deactivation message, for a CC group. In some cases, a management message may identify, explicitly or implicitly, the CC group associated with the management information in the configuration message. Similarly, the management message and/or a control message may be used to communicate control information, such as PHY layer parameters, for a CC group. Additionally, radio resource measurements may be taken for a CC group and radio resource parameters may be calculated and signaled for a CC group.

Aspects of the disclosure are initially described in the context of a wireless communications system. Specific examples are then described of carrier configurations and message formats for enhanced CA management. Aspects of the disclosure are further illustrated by and described with reference to apparatus diagrams, system diagrams, and flowcharts that relate to enhanced CA management.

FIG. 1 illustrates aspects of a wireless communications system 100 that supports enhanced CA management in accordance with various aspects of the present disclosure. For example, wireless communications system 100 includes base stations 105, user equipment (UEs) 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data.

In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the PHY layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected CCs using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a CA configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of defined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as CA or multi-carrier operation. A UE 115 may be configured with multiple downlink CCs and one or more uplink CCs according to a CA configuration. Carrier aggregation may be used with both FDD and TDD CCs.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A CC—which may also be referred to as an SCell—may be used to communicate information between wireless devices. A CC may occupy particular time and frequency resources and may span a frequency bandwidth ranging from 1.4 to 20 MHz.

To enable communications over a CC, management and control signaling (e.g., RRC and PHY layer signaling) may be communicated between wireless devices. For example, a base station 105 may configure a UE 115 for communications over a CC using RRC signaling—the RRC signaling may include information for identifying a bandwidth of the CC, setting up radio bearers, performing handover, providing radio resource measurements, and the like. The base station 105 may also communicate PHY layer parameters for communicating over the CC to the UE 115. In some cases, the base station 105 communicates PHY layer parameters that indicate downlink and uplink resource scheduling information for communications over the CC—e.g. a TM and/or HARQ feedback timing to be used for communications over the CC.

In some cases, multiple CCs may be configured for concurrent communications between wireless devices using a technique which may be referred to as CA. In some cases, the multiple CCs may be different sizes (e.g., have different frequency bandwidths) and/or be located in different frequency bands. Also, a base station 105 and UE 115 may be configured to communicate information over one CC using a first set of communication parameters (e.g., using a first TM) and another CC using a different set of communication parameters (e.g., using a second TM).

In some examples, different combinations of the configured CCs may be used for communications between the wireless devices—e.g., based on channel conditions. For example, a base station 105 and UE 115 may be configured to use a first combination of CCs for CA communications when channel conditions are above a first threshold and to use a second combination of the configured CCs when channel conditions are above a second threshold. In some cases, the channel conditions may be determined based on radio resource measurements taken at the base station 105 and/or UE 115.

In some cases, to enable communications over different CC combinations, support for each possible CC combination may be required at the wireless devices. In one example with five CCs, a wireless device may be prepared to communicate over 31 different CC combinations—e.g., SUM(5-choose-5, 5-choose-4, 5-choose-3, 5-choose-2, 5-choose-1). As the number of configured CCs increases, the number of possible CC combinations increases disproportionately, quickly reaching thousands of CC combinations. Continuing to support each of the CC combinations as the number of aggregated CCs increases may introduce significant setup overhead and increase the complexity of CA communications.

To reduce setup overhead and the number of supported CC combinations, CC groups including multiple CCs may be configured.

For example, the number of supported CC combinations may be reduced by grouping CCs in a limited number of CC groups—e.g., a number of CC groups may be less than the number of CC combinations. Grouping CCs may include establishing CC groups including $2^n$ CCs, where n is an integer greater than or equal to zero. In some cases, grouping of CCs may be performed only for intra-band CCs.

The grouping of CCs may be accomplished using explicit and/or implicit techniques. In an implicit operation, for example, CCs may be grouped according to indices associated with the CCs. In an explicit operation, for example, CCs may be grouped by a wireless network (e.g., based on channel conditions, a frequency location of the CCs, and the like). For example, a base station 105 may identify and assign particular CCs to particular CC groups. In some cases, a configuration message may be used to indicate, either explicitly or implicitly, the assignment of CCs to different CC groups.

After grouping the CCs, base station 105 and UE 115 may communicate in accordance with the CC groups. That is, the base station 105 and UE 115 may support communications over the CC combinations corresponding to the CC groups.

In some examples, management and control information is individually signaled for each CC in a set of aggregated CCs. For example, a base station 105 may send separate management information for each CC in a set of aggregated CCs and separate control information for each active CC. But sending separate management and control signaling per CC may increase the amount of signaling overhead and decrease the throughput of the wireless communications system 100. Also, as the number of configured CCs increases, the amount of management and control signaling also increases. Continuing to send separate management and control signaling per CC as the number of aggregated CCs increases may significantly increase signaling overhead, decreasing the relative throughput of CA communications.

To reduce the amount of management and control signaling for CA communications, CCs may be managed on a per CC group basis.

As discussed herein, CCs may be grouped into CC groups. In some cases, once CCs have been grouped together, the group of CCs may effectively be treated as a single CC. Accordingly, a single set of management and control signaling that is applicable to each CC in a CC may be communicated for a CC group. For example, a base station 105 may transmit management and control signaling to a UE 115 corresponding to a single CC for a CC group, and the base station 105 and the UE 115 may communicate over each CC in the CC group according to the management and control signaling—e.g., management and control signaling for a single CC may be applied across multiple CCs in a CC group. By transmitting a single set of management and control signaling, multiple CCs may be managed at a same time using less signaling overhead.

In some examples, a management message may be used to communicate management information for a CC group. In some cases, the management message may indicate a configuration of CCs, including a configuration of CC groups. In some cases, a management message may include an activation or deactivation of a CC group for CA communications. In some cases, the management message may identify, explicitly or implicitly, the CC group associated with the management information in the management message. For example, the management message may include a CC group identifier or the management message may indicate a CC group by including one or more CC indices corresponding to a CC group in the management message.

For example, a base station 105 may transmit a first management message configuring a set of CCs for CA and/or indicating an assignment of the configured CCs to a CC group (which may be referred to as a configuration message). After transmitting the first management message, the base station 105 may transmit a message including information activating a first CC group to a UE 115 (which may be referred to as an activation message). After receiving the activation message, the UE 115 may activate the first CC group and may begin communicating with the base station 105 over the CCs in the first CC group.

Similarly, a control message may be used to communicate control information, such as PHY layer parameters, for a CC group. By communicating control signaling that is applicable across a CC group, multiple CCs may be managed with a single control message that applies to each CC in a CC group—e.g., instead of sending separate control messages for each of the CCs.

Additionally, radio resource measurements may be taken for a CC group. Also, radio resource parameters may be calculated and signaled for a CC group. This way, radio resource signaling overhead and processing may be reduced.

Figure 2:
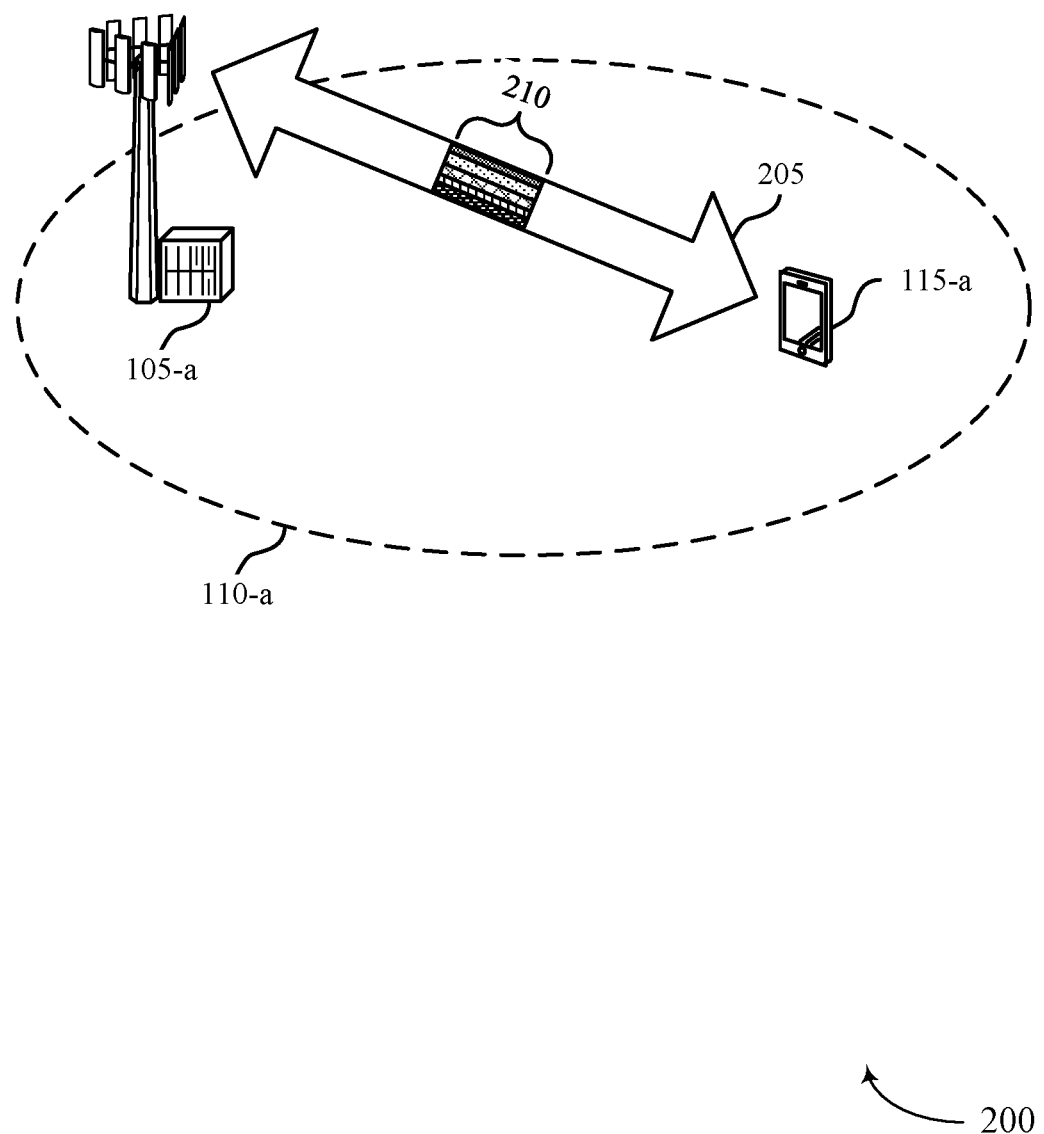
FIG. 2 illustrates aspects of a wireless communications subsystem that supports enhanced CA management in accordance with various aspects of the present disclosure.

FIG. 2 illustrates aspects of a wireless communications subsystem 200 that supports enhanced CA management in accordance with various aspects of the present disclosure. For example, wireless communications subsystem 200 may include UE 115-a and base station 105-a, which may be examples of a UE 115 or a base station 105 and may communicate with one another as described above with reference to FIG. 1.

Communication link 205 may be used to communicate uplink or downlink information between base station 105-a and UE 115-a. Communication link 205 may occupy particular time and frequency resources and may include CCs 210.

CCs 210 may also be used to communicate uplink or downlink information between base station 105-a and UE 115-a. CCs 210 may include a number of CCs (e.g., from 2 to 32 CCs). In some cases, each CC of CCs 210 may be associated with a respective identifier (e.g., a number). For instance, a first CC may be designated as CC_1, a second CC may be designated as CC_2, and so on. In some cases, a number of CCs 210 may be dispersed across different frequency bands. For example, one of CCs 210 may be located in a first frequency band, multiple of CCs 210 may be located in a second frequency band, and so on. Also, a number of CCs 210 may have different frequency sizes—e.g., a first CC may span 1.4 MHz and another CC may span 10 MHz.

In some cases, one of CCs 210 is used to communicate uplink or downlink information between base station 105-a and UE 115-a. In other cases, multiple of CCs 210 are concurrently used to communicate uplink or downlink information between base station 105-a and UE 115-a—using a technique which may also be referred to as CA. In some examples, base station 105-a transmits downlink information to UE 115-a using the configured CCs 210 and UE 115-a transmits uplink information to base station 105-a using the configured CCs 210.

As discussed herein, supporting each combination of CCs 210 for CA communications at a wireless device may result in significant setup and signaling overhead. To reduce the number of supported CC combinations, a wireless system may use groups of CCs to perform CA communications.

In an example where wireless communications subsystem 220 supports the grouping of CCs, base station 105-a may configure CCs 210 for CA communications between base station 105-a and UE 115-a. In some cases, configuring CCs 210 includes performing CC addition—e.g., by transmitting a configuration message establishing each of CCs 210 for CA communications. In some cases, only CC combinations including $2^n$ CCs, where n is an integer greater than or equal to zero, are supported for CA communications, reducing the number of possible CC combinations. In some cases, only CC combinations including $2^n$ CCs are supported for CA communications with respect to CCs that are located within a single frequency band.

Before or after configuring CCs 210, all or a portion of CCs 210 may be grouped into one or more CC groups. For example, CCs 210 may include nine CCs, two of which may be included in a first CC group, four of which may be included in a second CC group, another two of which may be included in a third CC group, and one of which may not be included in any CC group. In some cases, a single CC may be included in its own CC group or treated as being in a CC group. In some cases, the CCs in a CC group may be treated as a single CC (e.g., activated/deactivated together and/or provided with common PHY layer parameters).

In some examples, a CC of CCs 210 is included in multiple groups. In some examples, only CCs within a single frequency band may be grouped together. For example, in a system with 8 CCs, if CC_2 to CC_6 represent CCs configured within a single frequency band and CC_1, CC_7, and CC_8 are each in different frequency bands, CC_2 to CC_6 may be assigned to CC Group_1, while CC_1, CC_7, and CC_8 may not be included in a CC group. In some cases, all of the CCs within a single frequency band may be grouped together. In some examples, each CC group includes $2^n$ CCs.

In some examples, the grouping of the CCs may be explicit. That is, base station 105-a may assign particular CCs to particular CC groups (e.g., for 8 CCs, base station 105-a may assign CC_1, CC_4, CC_5, and CC_6 to CC Group_1 and CC_2 and CC_3 to CC Group_2). Additionally, or alternatively, the grouping of CC may be implicit. That is, CCs 210 may be grouped based on CC numbers. In an example with 8 CCs, CC_1 to CC_8 may be implicitly assigned to CC Group_1, CC_1 to CC_4 may be implicitly assigned to CC Group_2, and CC_1 and CC_2 may be implicitly assigned to CC Group_3. In some examples, such as the previous example, each CC group may include $2^n$ CCs. By grouping CCs together, the number of CC combinations that need to be supported by a wireless device may be reduced. The different techniques for grouping CCs discussed herein may be performed alone or in combination with one another.

After the CCs have been grouped, explicitly and/or implicitly, base station 105-a may indicate which CCs belong to which CC groups to UE 115-a. Grouping of CCs is discussed in more detail herein and at least with reference to FIGS. 3A to 3C.

After CCs 210 have been grouped and configured, base station 105-a and UE 115-a may communicate with one another according to one or more of the CC groups. For instance, base station 105-a and UE 115-a may support CA communications over the designated CC groups, instead of supporting CA over each CC combination of CCs 210. In one example with 16 CCs, base station 105-a and UE 115-a may support CA communications over a first CC group including 16 of the CCs, additional CC groups including different combinations of eight of the 16 CCs (e.g., up to 16-choose-8 CC groups), additional CC groups including different combinations of four of the 16 CCs (e.g., up to 16-choose-4 CC groups), and additional CC groups including different combinations of two of the 16 CCs (e.g., up to 16-choose-2 CC groups). By performing CA communications according to CC groups, the number of CA combinations supported at a wireless device may be reduced and CA communications over many CCs may be simplified.

As discussed herein, to reduce signaling overhead for CA communications, the CCs included in a CC group may be treated as single CC and management and/or control signaling may be communicated on a per CC group basis.

For example, base station 105-a may communicate management signaling, such as activation and deactivation messages, on a per group basis. For instance, base station 105-a may transmit an activation message including an indication that a currently used first CC group has been deactivated and a second CC group is activated and to be used for communications. Accordingly, UE 115-a may refrain from performing communications over the combination of CCs associated with the first CC group and begin performing communications over the combination of CCs associated with the second CC group. Similarly, a change in the configuration of a CC group (e.g., a change in RRC configuration) may be performed for the entire CC group. An example configuration message is discussed in more detail herein and at least with reference to FIG. 4.

Base station 105-a may also communicate control signaling, which may include physical layer parameters (e.g., a transmission mode, scheduling parameters, such as K0, K1, K2, K3, and/or a bandwidth part (BWP) configuration) for communicating with UE 115-a over a particular CC group. For instance, base station 105-a may transmit a control message including an indication of transmission and/or scheduling parameters for a CC group. UE 115-a may receive the control message and perform communication over each CC of the CC group according to the PHY layer parameters. For example, base station 105-a and UE 115-a may use a same transmission mode for communicating over each CC in a CC group. In some examples, a size of the control signaling is equivalent to or similar in size to control signaling that is sent for a single CC. An example physical layer parameter message is discussed in more detail herein and at least with reference to FIG. 5.

In some cases, a management and/or control message may explicitly or implicitly identify a CC group. For example, the signaling may include a field explicitly conveying an identifier of a CC group. In another example, a management and/or control message may include a field implicitly identifying a CC group—e.g., by conveying an identifier of a CC in a corresponding CC group. For instance, if all of the configured CCs 210 are allocated to CC groups including $2^n$ CCs, then a first CC group may be identified by signaling the identifier for CC_2, a second CC group may be identified by signaling the identifier for CC_4, a third CC group may be identified by signaling the identifier for CC_8, and so on.

By signaling one set of management and/or control information for an entire CC group, groups of CCs may be treated and handled as a single CC from a management point of view, multiple CCs may be managed with a single message, and control signaling may be reduced.

In a similar example of reduced signaling, base station 105-*a* and UE 115-*a* may perform radio resource measurements for a CC group instead of for each CC. Radio resource measurements may be used for procedures such as cell selection, cell reselection, and handover and may include measurements for or calculations of reference signal received power (RSRP), received signal strength indicator (RSSI), reference signal received quality (RSRQ), and signal to interference and noise ratio (SINR). Accordingly, base station 105-*a* and UE 115-*a* may signal a single set of radio resource measurements for a CC group as opposed to signaling a radio resource measurement for each CC in a CC group.

By performing radio resource measurement on a CC group basis, single measurements may be signaled for each CC in a CC group, reducing signaling overhead. Also, processing used to calculate the measurement may be performed collectively instead of individually, reducing processing resources for taking and computing the measurements.

Figure 3B:
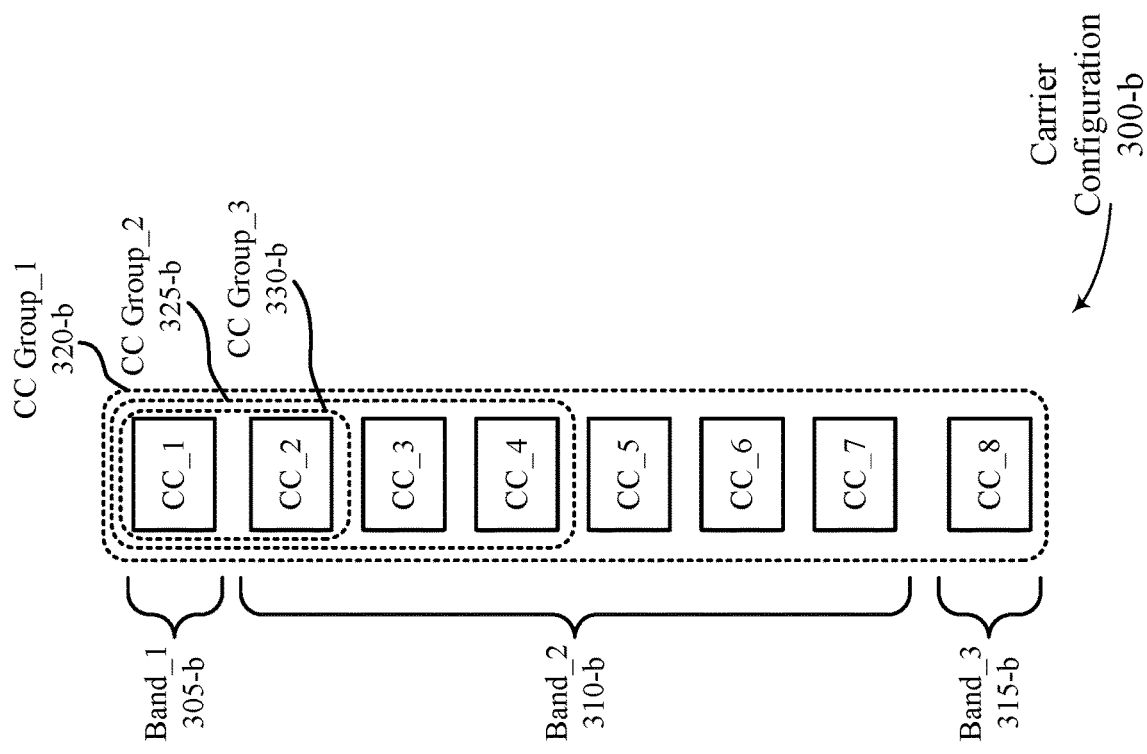
Figure 3A:
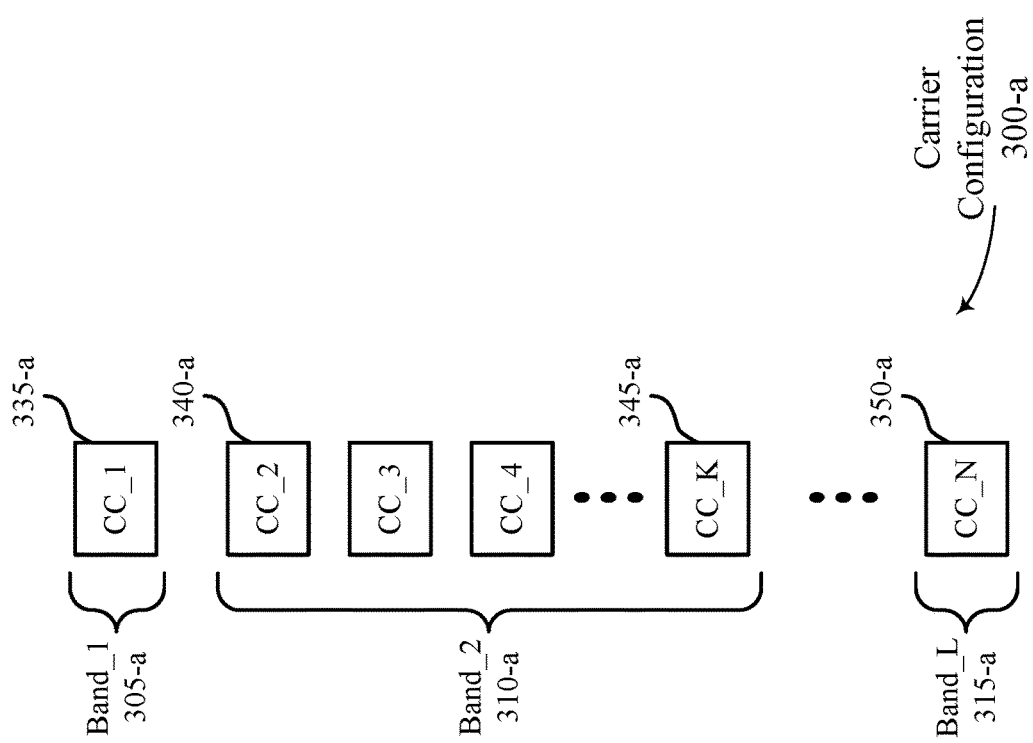

FIG. 3A illustrates aspects of a CC configuration 300-*a* that supports enhanced CA management in accordance with various aspects of the present disclosure. For example, CC configuration 300-*a* may depict the aggregation of multiple CCs for CA communications between a base station and a UE. CC configuration 300-*a* may include first frequency band 305-*a*, second frequency band 310-*a*, and so one up to an Lth frequency band 315-*a*.

First frequency band 305-*a* may be used by a wireless network for wireless communications. First frequency band 305-*a* may occupy a first set of frequency resources and have a bandwidth ranging from 5 to 100 MHz. First frequency band 305-*a* may occupy licensed or unlicensed spectrum. Multiple CCs may be configured for CA in first frequency band 305-*a*. In some examples, a first CC 335-*a* is configured for CA in first frequency band 305-*a*.

Second frequency band 310-*a* may be configured similarly to first frequency band 305-*a* and may also be used by a wireless network for wireless communications. Multiple CCs may be configured for CA in second frequency band 310-*a*. In some examples, a second CC 340-*a* to a Kth CC 345-*a* may be configured for CA in second frequency band 310-*a*.

Lth frequency band 315-*a* may be configured similarly to first frequency band 305-*a* and may also be used by a wireless network for wireless communications. Multiple CCs may be configured for CA in Lth frequency band 315-*a*. In some examples, an Nth CC 350-*a* may be configured for CA in Lth frequency band 315-*a*. In some cases, a value of N ranges from 2 to 32.

The CCs included in CC configuration 300-*a*, such as first CC 335-*a*, second CC 340-*a*, Kth CC 345-*a*, and Nth CC 350-*a*, and so on, may occupy frequencies ranging from 1.4 to 20 MHz within a corresponding frequency band. In some examples, the CCs may have different frequency sizes. In some examples, communication resources within the CCs and assigned for a CA communication between a UE and base station may be offset from one another (e.g., overlapping or non-overlapping) in time.

In some examples, a UE and base station may be configured to perform CA communications over all or a portion of the configured CCs (e.g., CC_1 to CC_N). Also, the UE and base station may be configured to support CA communications over combinations of the configured CCs. For example, the UE and base station may be configured to support CA communications over combinations of the configured CCs that include $2^n$ CCs. In one example where CC_N is equivalent to CC_16, the UE and base station may support communications over all 16 CCs (corresponding to one CC combination), over the different CC combinations including eight of the 16 CCs (corresponding to 16-choose-8 CC combinations), over the different CC combinations including four of the 16 CCs (corresponding to 16-choose-4 CC combinations), and over the different CC combinations including two of the 16 CCs (corresponding to 16-choose-2 CC combinations). By limiting the number of CC combinations, CA may be simplified.

In some cases, the UE and base station may be configured to support CA communications over combinations of the configured CCs that include $2^n$ CCs for configured CCs that are included within a single frequency band. In one example where CC_K is equivalent to CC_9 and CC_N is equivalent to CC_10, the UE and base station may support communications over all eight of the eight CCs included within second frequency band 310-*a* (corresponding to one CC combination), over the different CC combinations including four of the eight CCs included within second frequency band 310-*a* (corresponding to 8-choose-4 CC combinations), over the different CC combinations including two of the eight CCs included within second frequency band 310-*a* (corresponding to 8-choose-2 CC combinations), and over the different CC combinations including first CC 335-*a*, the three CC combination groups associated with second frequency band 310-*a*, and Nth CC 350-*a* (corresponding to the SUM(5-choose-5, 5-choose-4, 5-choose-3, 5-choose-2, 5-choose-1) CC combinations).

In some examples, subsets of the CCs may be included in CC groups. For example, combinations of the CCs may be grouped into CC groups. In some cases, each CC group may include $2^n$ CCs. In some cases, a CC group may include all of the CCs in a frequency band—e.g., a CC group may include CC_2 to CC_K. In some cases, CC grouping is only applied for CCs sharing a common frequency band (such as CC_2 to CC_K). For example, CC_2 to CC_K may be included in one or more CC groups that each include $2^n$ CCs. In one example where CC_K is equivalent to CC_9, a first CC group may include CC_2 and CC_3, a second CC group may include CC_2 to CC_5, and a third CC group may include CC_2 to CC_9.

FIG. 3B illustrates aspects of a CC configuration 300-*b* that supports enhanced CA management in accordance with various aspects of the present disclosure. For example, CC configuration 300-*b* may depict the aggregation of multiple CCs. CC configuration 300-*b* may include first frequency band 305-*b*, second frequency band 310-*b*, and Lth frequency band 315-*b*, which may be examples of first frequency band 305-*a*, second frequency band 310-*a*, and Lth frequency band 315-*a*, as discussed with reference to FIG. 3A. The CCs included in first frequency band 305-*b*, second frequency band 310-*b*, and Lth frequency band 315-*b* may be configured similarly to the CCs discussed with reference to FIG. 3A.

In some examples, first frequency band 305-*b* includes one CC (e.g., CC_1), second frequency band 310-*b* includes six CCs (e.g., CC_2 to CC_7), and Lth frequency band 315-*b* includes one CC (e.g., CC_8).

In some examples, the CCs may be implicitly grouped based on a CC identifier or number. For example, if eight CCs (e.g., CC_1 to CC_8) are configured for CA and a $2^n$ bundling method is used, then CC_1 and CC_2 may be included in first CC group 320-b, CC_1 to CC_4 may be included in a second CC group 325-b, and CC_1 to CC_8 may be included in third CC group 330-b.

As illustrated in this example, some CCs may be included in one or more CC groups. In some cases, CCs may be limited to one CC group. Also, while this example provides one possible configuration for grouping CCs, other configurations are possible.

FIG. 3C illustrates aspects of a CC configuration 300-c that supports enhanced CA management in accordance with various aspects of the present disclosure. For example, CC configuration 300-c may depict the aggregation of multiple CCs. CC configuration 300-c may include first frequency band 305-c, second frequency band 310-c, and Lth frequency band 315-c, which may be examples of first frequency band 305-a, second frequency band 310-a, and Lth frequency band 315-a, as discussed with reference to FIG. 3A. The CCs included in first frequency band 305-c, second frequency band 310-c, and Lth frequency band 315-c may be configured similarly to the CCs discussed with reference to FIG. 3A.

In some examples, first frequency band 305-c includes one CC (e.g., CC_1), second frequency band 310-c includes eight CCs (e.g., CC_2 to CC_9), and Lth frequency band 315-c includes one CC (e.g., CC_10).

In some examples, the CCs within a frequency band may be explicitly or implicitly grouped based on a CC identifier or number. For example, if ten CCs (e.g., CC_1 to CC_10) are configured for CA, eight of the ten CCs are included in second frequency band 310-c (e.g., CC_2 to CC_9), and a $2^n$ bundling method is used, CC_2 and CC_3 may be included in first CC group 320-c, CC_2 to CC_5 may be included in a second CC group 325-c, and CC_2 to CC_9 may be included in third CC group 330-c.

It is worth noting that this example provides one possible configuration for grouping CCs and other configurations are possible.

FIG. 3D illustrates aspects of a CC configuration 300-d that supports enhanced CA management in accordance with various aspects of the present disclosure. For example, CC configuration 300-d may depict the aggregation of multiple CCs. CC configuration 300-d may include first frequency band 305-d, second frequency band 310-d, and Lth frequency band 315-d, which may be examples of first frequency band 305-a, second frequency band 310-a, and Lth frequency band 315-a, as discussed with reference to FIG. 3A. The CCs included in first frequency band 305-d, second frequency band 310-d, and Lth frequency band 315-d may be configured similarly to the CCs discussed with reference to FIG. 3A.

In some examples, first frequency band 305-d includes one CC (e.g., CC_1), second frequency band 310-d includes eight CCs (e.g., CC_2 to CC_9), and Lth frequency band 315-d includes one CC (e.g., CC_10).

In some examples, the CCs may be explicitly grouped by a wireless network. For example, if eight CCs (e.g., CC_1 to CC_8) a 405 re configured for CA, a wireless network may group together CC_1 and CC_3 in a first CC group 320-d, may group together CC_2, CC_4, CC_5, and CC_6 in a second CC group 325-b, and may group together CC_7 and CC_8 in a third CC group 330-b.

It is worth noting that this example provides one possible configuration for grouping CCs and other configurations are possible.

Figure 4:
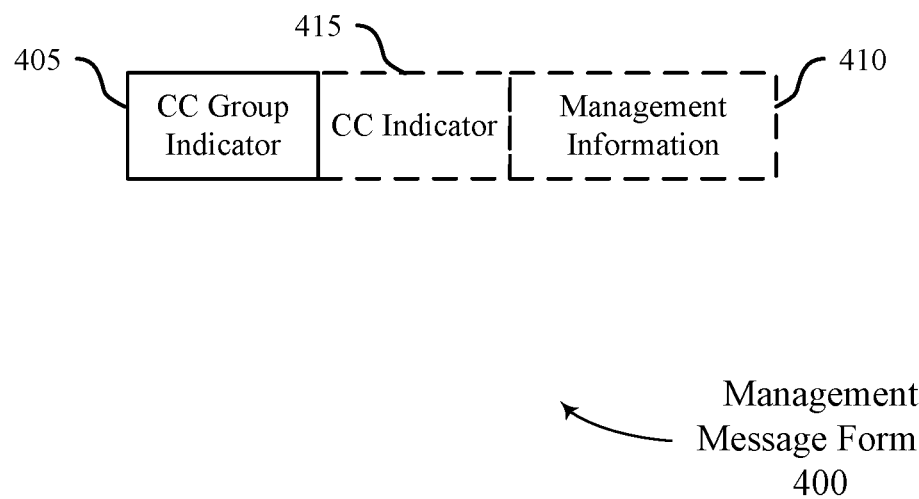
FIGS. 4 and 5 illustrate aspects of message formats that support enhanced CA management in accordance with various aspects of the present disclosure.

FIG. 4 illustrates aspects of a management message format 400 that supports enhanced CA management in accordance with various aspects of the present disclosure. For example, management message format 400 may be configured to convey management information for a CC group. Management message format 400 may include CC group indicator field 405 and management information field 410.

CC group indicator field 405 may be configured to identify a CC group. In some cases, CC group indicator field 405 explicitly identifies a CC group by conveying a value corresponding to an identify of the CC group. For example, CC group indicator field 405 may include multiple bits and may indicate the third CC group by setting the two least significant bits to the value "11".

In some cases, CC group indicator field 405 implicitly identifies a CC group by conveying a value corresponding to an identity of a CC included in the CC group. For example, when implicit grouping is used, CC group indicator field 405 may identify a CC group by including a value corresponding to the highest CC of the CC group in CC group indicator field 405—e.g., CC group indicator field 405 may indicate a first CC group including CC_1 and CC_2 by indicating the value "2", may indicate a second CC group including CC_1 and CC_4 by indicating the value "4", and so on.

Management information field 410 may be configured to provide management information for the CCs included in the CC group identified in CC group indicator field 405. In some cases, management information field 410 includes an activation message that activates the CCs in the CC group indicated in CC group indicator field 405 for CA communications. In some cases, management information field 410 includes an activation message that deactivates the CCs in the CC group indicated in CC group indicator field 405 for CA communications. In some cases, CCs that are deactivated are still available for CA communications between two wireless devices but are not currently used by the wireless devices. Management information field 410 may also include information for adding and removing CCs from a CC group. Management information field 410 may also include information for enabling and disabling CCs for CA communications.

CC indicator field 415 may be used in combination with CC group indicator field 405 to indicate a mapping of particular CCs to a CC group. For example, CC group indicator field 405 may identify a CC group while CC indicator field 415 may identify a number of CCs, where the identified CCs may be mapped to the identified CC group. In some cases, CC indicator field 415 identifies the CCs by including values corresponding to the CC numbers of the CCs.

In some examples, a base station transmits a management message to a UE according to management message format 400. In some cases, the base station explicitly or implicitly indicates that the management information included in the management message is intended for a particular CC group by setting a value in CC group indicator field 405. A UE may receive the management message and may apply the management information to the CCs associated with the identified CC group.

In some examples, if CA configuration information is included in management information field 410 (which may be referred to as a configuration message), the UE may configure a set of CCs for CA. For instance, if the configuration message includes configuration information for a set of CCs, the UE may configure the set of CCs for CA. In some cases, the configuration message explicitly or implicitly indicates which CCs are mapped to which CC groups by setting different combinations of values in CC group indicator field 405 and CC indicator field 415. When mapping information is included in the configuration message, a UE may receive the configuration message and may determine which CCs are mapped to which CC groups. The UE may then communicate with the base station based on the received mapping. For example, in some cases, the UE may support CA communications over the identified CC groups.

In some examples, if activation information is included in management information field 410 (which may also be referred to as an activation message), the UE may activate the CC group for CA communications and begin performing communications over the combination of CCs corresponding to the activated CC group. In some cases, the UE may also deactivate a set of CCs that were previously being used for CA communications until another activation message for that set of CCs is received. In another example, if deactivation information is included in management information field 410 (which may also be referred to as a deactivation message), the UE may deactivate the CC group for CA communications and refrain from performing communications over the combination of CCs corresponding to the deactivated CC group (e.g., until another activation message for that set of CCs is received). In another example, if reconfiguration information is included in management information field 410, the UE may establish or deactivate radio bearers for the CC group, add additional CCs to the CC group, or the like.

Figure 5:
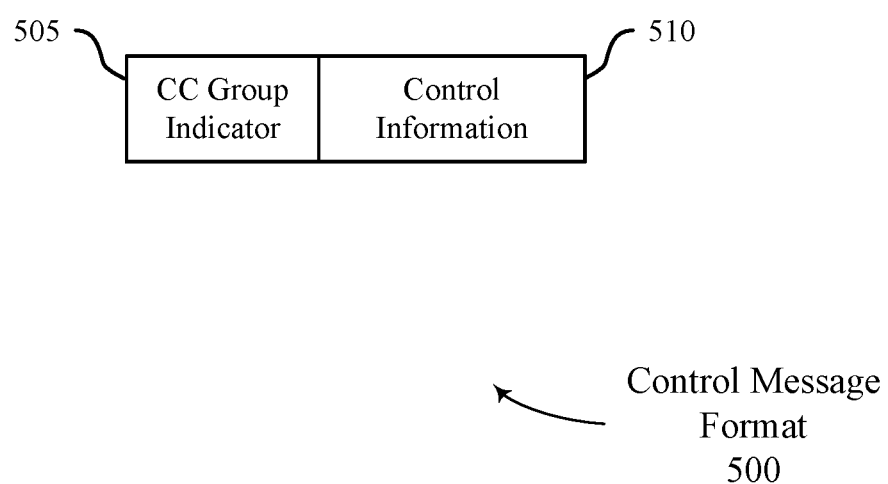

FIG. 5 illustrates aspects of a control message format 500 that supports enhanced CA management in accordance with various aspects of the present disclosure. For example, control message format 500 may be configured to convey management information for a wireless communications system that implements CC groups. Control message format 500 may include CC group indicator field 505 and a control information field 510.

CC group indicator field 505 may be an example of CC group indicator field 405, as discussed with reference to FIG. 4, and may be configured to implicitly or explicitly indicate a CC group.

Control information field 510 may be configured to convey control information for the CCs included in the CC group identified in CC group indicator field 505. In some cases, control information field 510 conveys physical layer parameters for communicating over a CC group. The physical layer parameters may include transmission and resource scheduling parameters. For instance, the physical layer parameters may include a TM parameter, a delay indicator between when a downlink grant is received and corresponding downlink data is received (which may also be referred to as K0), a delay indicator between when downlink data is received and corresponding uplink HARQ feedback (e.g., an ACK/NACK) is transmitted (which may also be referred to as K1), a delay indicator between when an uplink grant is received and corresponding uplink data is transmitted (which may also be referred to as K2), a delay indicator between when uplink HARQ feedback is received and a corresponding downlink retransmission is transmitted (which may also be referred to as K3), a BWP configuration, and the like.

In some examples, a base station transmits a PHY layer message according to control message format 500. In some cases, the base station explicitly or implicitly indicates that the management information included in the configuration message is intended for a particular CC group by setting a value in CC group indicator field 505.

A UE may receive the PHY layer message and may apply the control information to the CCs associated with the identified CC group. For example, if a TM parameter is included in control information field 510, the UE may communicate with the base station over each of the CCs included in the identified CC group according to the received TM parameter—e.g., the UE may identify a resource mapping corresponding to the TM mode that is applicable to each of the CCs. Additionally, or alternatively, if a K0 delay parameter is included in control information field 510, the UE may communicate with the base station over each of the CCs included in the identified CC group according to the received K0 delay parameter. For example, the UE may determine that a certain period of time will elapse between receiving a downlink grant and corresponding downlink data for communications over each of the CCs. Additionally, or alternatively, if a BWP parameter is included in control information field 510, the UE may communicate with the base station over each of the CCs included in the identified CC group according to the received BWP parameter—e.g., the UE may determine that a particular operating bandwidth is to be used for each of the CCs.

Figure 6:
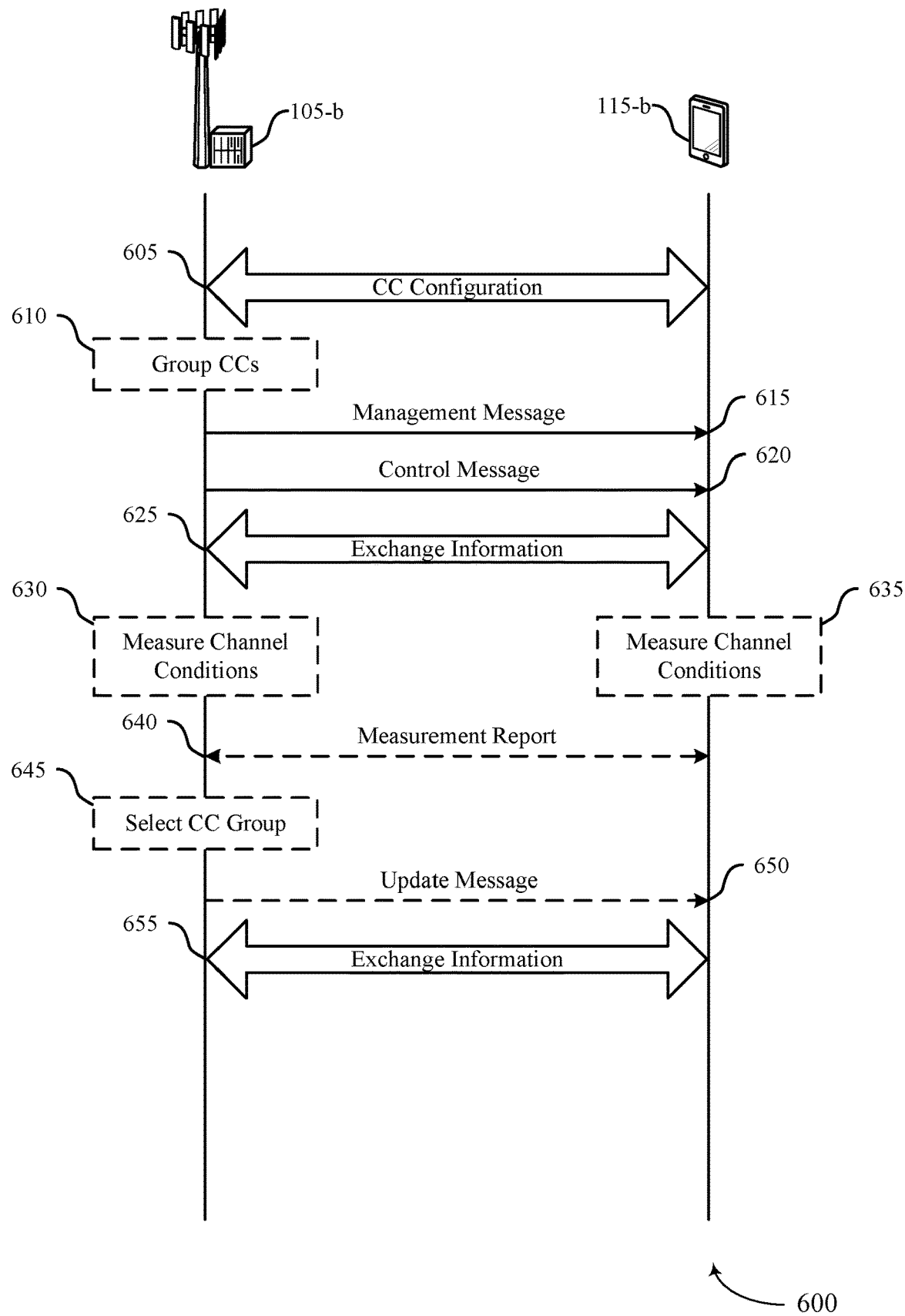
FIG. 6 illustrates aspects of a process for enhanced CA management in accordance with various aspects of the present disclosure.

FIG. 6 illustrates aspects of a process for enhanced CA management in accordance with various aspects of the present disclosure. Process flow 600 may be performed by UE 115-*b* and base station 105-*b*, which may be an example of a UE 115 and base station 105 described above with reference to FIGS. 1-2. In some examples, base station 105-*b* and UE 115-*b* may perform CA according to CC groups. Also, base station 105-*b* and UE 115-*b* may perform management and control procedures (such as taking measurements and communicating signaling) on a per CC group basis.

At 605, base station 105-*b* and UE 115-*b* may establish CCs for CA communications. In some cases, base station 105-*b* and UE 115-*b* may configure up to 32 CCs for CA. In some cases, the configured CCs may be spread across one or more frequency bands. The configuration of the CCs may be performed using RRC signaling in a process which may be referred to as SCell addition. In some cases, base station transmits a configuration message indicating a set of CCs to configure for CA communications. In some cases, the configuration message is constructed according to management message format 400.

In some cases, base station 105-*b* and UE 115-*b* may configure $2^n$ CCs, where n is an integer greater than zero. When $2^n$ CCs are configured, base station 105-*b* and UE 115-*b* may support only combinations of $2^n$ CCs for CA—e.g., for 16 configured CCs, base station 105-*b* and UE 115-*b* may support CA of all 16 CCs, of all of the different combinations of eight of the 16 CCs, of all of the different combinations of four of the 16 CCs, and of all of the different combinations of two of the 16 CCs.

In some cases, the configured CCs are implicitly assigned to CC groups. For instance, each of the above combinations may be assigned to a CC group. In some examples, a CC may be assigned to more than one CC group. In other examples, a CC may be assigned to a single CC group. That is, CC groups may be disjoint or non-disjoint (e.g., overlapping or partially overlapping). In some cases, the configured CCs may be implicitly assigned to CC groups based on a CC identifier, such as an index. For example, when a $2^n$ grouping technique is used, 16 CCs having the identifiers CC_1 to CC_16 may be grouped such that CC_1 and CC_2 are assigned to a first CC group, CC_1 to CC_4 are assigned to a second CC Group, CC_1 to CC_8 are assigned to a third CC Group, and CC_1 to CC_16 are assigned to a fourth CC Group. That is, each CC in a group with a lower number of CCs may overlap with a CC of one or more groups with a larger number of CCs. Additionally or alternatively, when a $2^n$ grouping technique is used for disjoint CC groups, a set of 15 CCs having the identifiers CC_1 to CC_15 may be grouped such that CC_1 is assigned to a first CC group, CC_2 and CC_3 are assigned to a second CC group, CC_4 to CC_7 are assigned to a third CC Group, and CC_8 to CC_15 are assigned to a fourth CC Group.

In some cases, the configured CCs may be implicitly assigned to CC groups based on a frequency band location of the CCs. For instance, each of the configured CCs in a single frequency band may be grouped together. In some cases, each of the configured CCs in a same frequency band may further be grouped according to the $2^n$ grouping technique discussed herein. In some examples, if a single CC is included in a frequency band, then that CC may not be assigned to a CC group. In some cases, when the configured CCs are implicitly assigned to CC groups, base station 105-b and UE 115-b may determine the CC groupings without exchanging information regarding the CC groupings.

In some cases, the configuration message indicates that CCs are implicitly assigned to CC groups using techniques discussed herein. For instance, the configuration message may not identify any CC groups in the configuration message. In such cases, base station 105-b and UE 115-b may determine the CC groupings on their own. In other cases, the configuration message may include an explicit indication of which CCs have been grouped to which CC groups. For instance, the configuration message may include CC group identifiers along with corresponding CC identifiers. With either implicitly assigned or explicitly assigned groups, base station 105-b and UE 115-b may determine a mapping of CCs to CC groups.

At 610, in some cases, base station 105-b may explicitly assign particular CCs to particular CC groups. In some cases, base station 105-b may assign the CCs to CC groups based on channel conditions, frequency locations of the CCs, and the like. In some cases, base station 105-b may assign all of the CCs in a single frequency band to a CC group and refrain from assigning CCs that are alone in a frequency band to a CC group. In some examples, 610 occurs before the CCs are established as discussed at 605.

At 615, base station 105-b may transmit, to UE 115-b, an activation or deactivation message—e.g., constructed according to management message format 400. An activation message may include an activation of all or a subset of the configured CCs (which may be referred to as an activation message). For instance, the activation message may include an implicit or explicit identification of a CC group as discussed herein. In some cases, the activation message is transmitted for a first CC group including a first set of CCs. After receiving the activation message for the first CC group, UE 115-b may activate the first set of CCs for CA communications with base station 105-b over the first set of CCs. In some cases, the first set of CCs are all located in a same frequency band. In some cases, the first set of CCs includes $2^n$ CCs. In some examples, UE 115-b may deactivate a second set of CCs included in a second CC group based on receiving the activation message for the first CC group. Different configuration messages—e.g., messages deactivating CC groups, reconfiguring CC groups (e.g., adding or removing CCs from a CC group), reconfiguring radio bearers, etc.—may similarly be communicated between base station 105-b and UE 115-b.

At 620, base station 105—may transmit and UE 115-b may receive a control message—e.g., constructed according to control message format 500. In some cases, the control message includes PHY layer parameters such as transmission and scheduling parameters. Transmission parameters may include an indication of a TM and scheduling parameters may include an indication of a delay between scheduling certain resources (e.g., K0, K1, K2, or K3 delay). In some cases, the control message may be transmitted for a first CC group and the PHY layer parameters may be applicable to each CC in the first CC group. In such cases, the control message may also include an indication of the first CC group. After receiving the control message, UE 115-b may apply the PHY layer parameters to each CC in the first CC group for subsequent communications over the CCs.

At 625, base station 105-b and UE 115-b may exchange information over a first set of CCs corresponding to the most recent CC group activated by a configuration message. In some cases, base station 105-b and UE 115-b may communicate with one another over the first set of CCs according to the PHY layer parameters received for the first CC group in the PHY layer message. For example, base station 105-b and UE 115-b may communicate over each CC of the first set of CCs using the same transmission and scheduling parameters.

At 630 and 635, in some cases, base station 105-b and/or UE 115-b may measure channel conditions for multiple CC groups. In some cases, base station 105-b and/or UE 115-b may measure a combined channel condition for each CC of a CC group as opposed to separately measuring a channel condition for each CC. In other cases, base station 105-b and/or UE 115-b may measure separate channel conditions for each CC of a CC group and combine the channel conditions together—e.g., by averaging the measured channel conditions. Base station 105-b and/or UE 115-b may also compute radio resource parameters such as RSRP, RSRQ, RSSI, and SINR for each CC group.

At 640, in some cases, base station 105-b and UE 115-b may exchange information relating to the measurements in a measurement report. In some cases, the measurement report includes a value corresponding to RSRP, RSRQ, RSSI, and SINR for each CC group. In some cases, the measurement report may include an indication of a CC group that is indicated as favorable for CA by UE 115-b.

At 645, in some cases, base station 105-b may assign a CC group for subsequent CA communications based on the received measurement report. In some cases, the CC group may be different from a CC group that is currently activated for CA. In some cases, base station 105-b may reconfigure radio resource information for one or more groups. In some examples, base station 105-b may determine new PHY layer parameters for transmitting over one or more CC groups based on the received measurement report.

At 650, in some cases, base station 105-b may transmit an update message to UE 115-b. In some cases, the update message may be constructed similarly to the configuration message sent at 615. The update message may include an indication of a CC group that is not currently activated as well as an indication that the CC group is to be activated for subsequent CA communications. After receiving the update message, UE 115-b may activate the indicated CC group and/or deactivate a currently active CC group. In some cases, the update message is a reconfiguration message and includes an indication that particular CCs configured for CA are to be added to or removed from one or more CC groups.

In some cases, the update message may be constructed similarly to the control message sent at 620. In some cases, the update message may include an indication of a CC group and an updated set of PHY layer parameters. After receiving the update message, UE 115-b may apply the updated PHY layer parameters to the CCs in the indicated CC group.

At 655, base station 105-b and UE 115-b may communicate with one another over the CCs corresponding to the currently activated CC group according to the latest PHY layer parameters received for the CC group.

Figure 7:
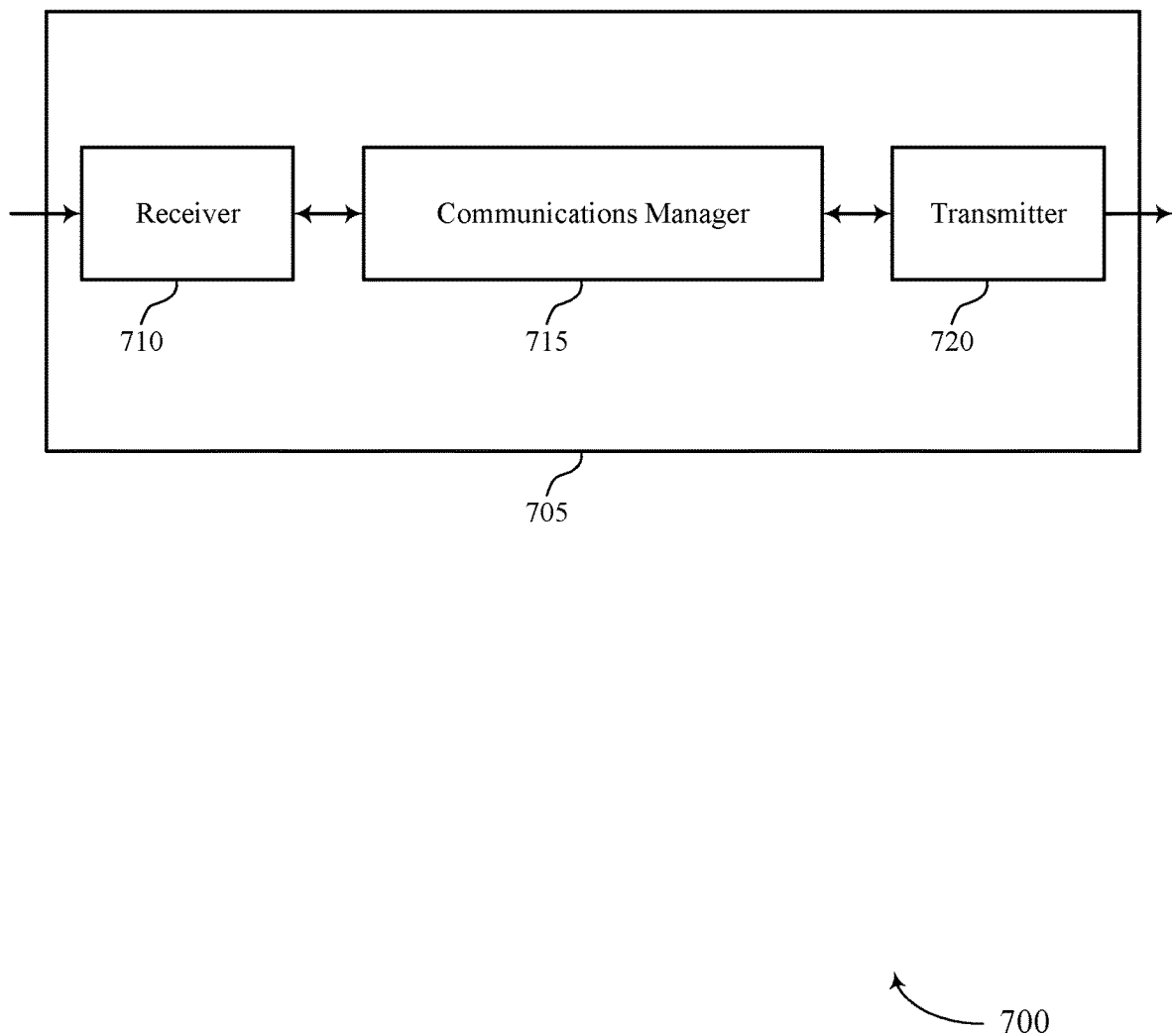
FIGS. 7 and 8 show block diagrams of devices that support enhanced CA management in accordance with aspects of the present disclosure.

FIG. 7 shows a block diagram 700 of a device 705 that supports enhanced CA management in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to enhanced CA management, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, an activation message indicating an activation of a first CC group for CA communications between the UE and the base station, the first CC group including a first set of CCs. The communications manager 715 may also receive, from the base station, a first set of physical layer parameters for the first CC group, the first set of physical layer parameters applicable to each of the CCs in the first CC group. The communications manager 715 may also communicate with the base station over the first set of CCs according to the first set of physical layer parameters. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
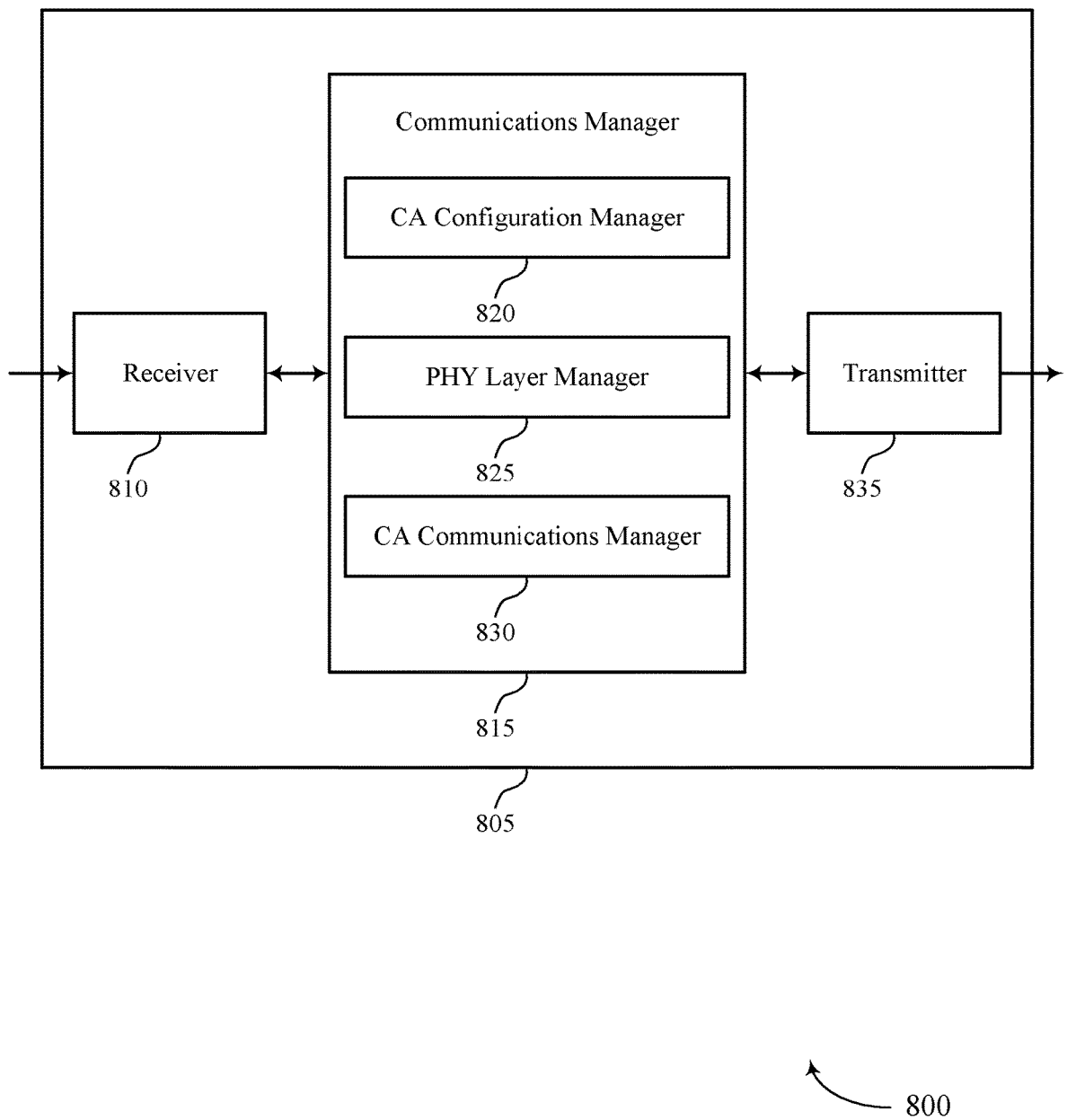

FIG. 8 shows a block diagram 800 of a device 805 that supports enhanced CA management in accordance with aspects of the present disclosure. The device 805 may be an example of aspects of a device 705 or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to enhanced CA management, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a CA configuration manager 820, a PHY layer manager 825, and a CA communications manager 830. The communications manager 815 may be an example of aspects of the communications manager 1010 described herein.

The CA configuration manager 820 may receive, from a base station, an activation message indicating an activation of a first CC group for CA communications between the UE and the base station, the first CC group including a first set of CCs.

The PHY layer manager 825 may receive, from the base station, a first set of physical layer parameters for the first CC group, the first set of physical layer parameters applicable to each of the CCs in the first CC group.

The CA communications manager 830 may communicate with the base station over the first set of CCs according to the first set of physical layer parameters.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
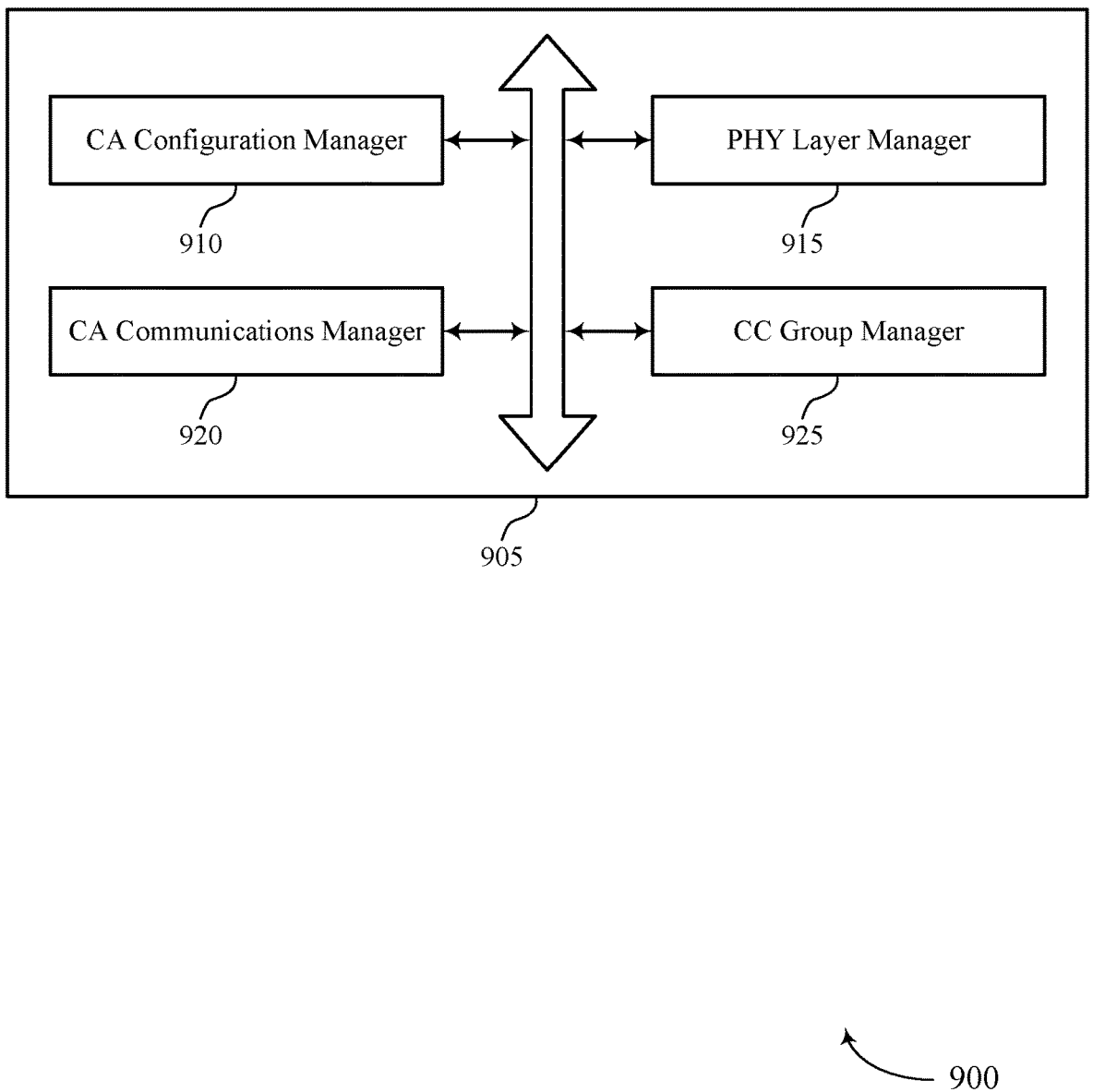
FIG. 9 shows a block diagram of a communications manager that supports enhanced CA management in accordance with aspects of the present disclosure.

FIG. 9 shows a block diagram 900 of a communications manager 905 that supports enhanced CA management in accordance with aspects of the present disclosure. The communications manager 905 may be an example of aspects of a communications manager 715, a communications manager 815, or a communications manager 1010 described herein. The communications manager 905 may include a CA configuration manager 910, a PHY layer manager 915, a CA communications manager 920, and a CC group manager 925. Each of these modules may communicate, directly or indirectly, with one another (e.g., via one or more buses).

The CA configuration manager 910 may receive, from a base station, an activation message indicating an activation of a first CC group for CA communications between the UE and the base station, the first CC group including a first set of CCs.

The CA configuration manager 910 may receive, from the base station, a configuration message indicating a configuration of a set of CCs for CA, where the set of CCs includes the first set of CCs and a second set of CCs, and where the configuration message further indicates an assignment of the first set of CCs to the first CC group.

In some cases, the configuration message indicates a set of CCs including the first set of CCs and a second set of CCs. In some cases, the first set of CCs and the second set of CCs are located within a first frequency band. In some cases, the first set of CCs are located within the first frequency band and the second set of CCs are located in at least one other frequency band. In some cases, the configuration message includes an indication identifying that the first set of CCs is assigned to the first CC group. In some cases, the first set of CCs includes $2^n$ CCs, n being an integer greater than zero. In some cases, the first CC group is selected from a set of supported groups that is based at least in part on a configured number of CCs, wherein each group of the set of supported groups comprises $2^n$ component carriers, n being an integer greater than zero.

In some cases, the configuration message indicates an assignment of a subset of the first set of CCs to a second CC group. In some examples, the CA configuration manager 910 may receive, from the base station, a second activation message activating the second CC group, and CA communications manager 920 may communicate with the base station over the subset of the set of CCs based on receiving the second activation message.

In some cases, the configuration message indicates an assignment of a second set of CCs to a second CC group. In some examples, the CA configuration manager 910 may receive, from the base station, a second activation message activating the second CC group, and CA communications manager 920 may communicate with the base station over the second set of CCs based on receiving the second activation message.

In some cases, each CC of the first set of CCs is associated with an index, and the CC group manager 925 may determine that the first set of CCs is assigned to the first CC group based on a respective index of each of the first set of CCs. In some cases, the configuration message includes an indication of at least one index of the first set of CCs.

The PHY layer manager 915 may receive, from the base station, a first set of physical layer parameters for the first CC group, the first set of physical layer parameters applicable to each of the CCs in the first CC group. In some cases, the first set of physical layer parameters includes a TM parameter, a K0 delay parameter, a K1 delay parameter, a K2 delay parameter, a K3 delay parameter, or a BWP configuration parameter, or any combination thereof. In some cases, the CA communications manager 920 may communicate with the base station over the first set of CCs according to the first set of physical layer parameters.

In some cases, the PHY layer manager 915 may receive, from the base station, a second set of physical layer parameters for the second CC group, the second set of physical layer parameters applicable to each of the CCs in the second CC group. In some cases, the CA communications manager 920 may communicate with the base station over the second set of CCs according to the second set of physical layer parameters.

The CA communications manager 920 may communicate with the base station over the first set of CCs according to the first set of physical layer parameters. In some examples, the CA communications manager 920 may measure channel conditions for the first CC group.

In some examples, the CA configuration manager 910 may receive, from the base station, a reconfiguration message and reconfigure radio resource information for the first set of CCs based on the reconfiguration message. In some examples, reconfiguring the radio resource information includes adding a CC to the first CC group or removing a CC from the first CC group.

Figure 10:
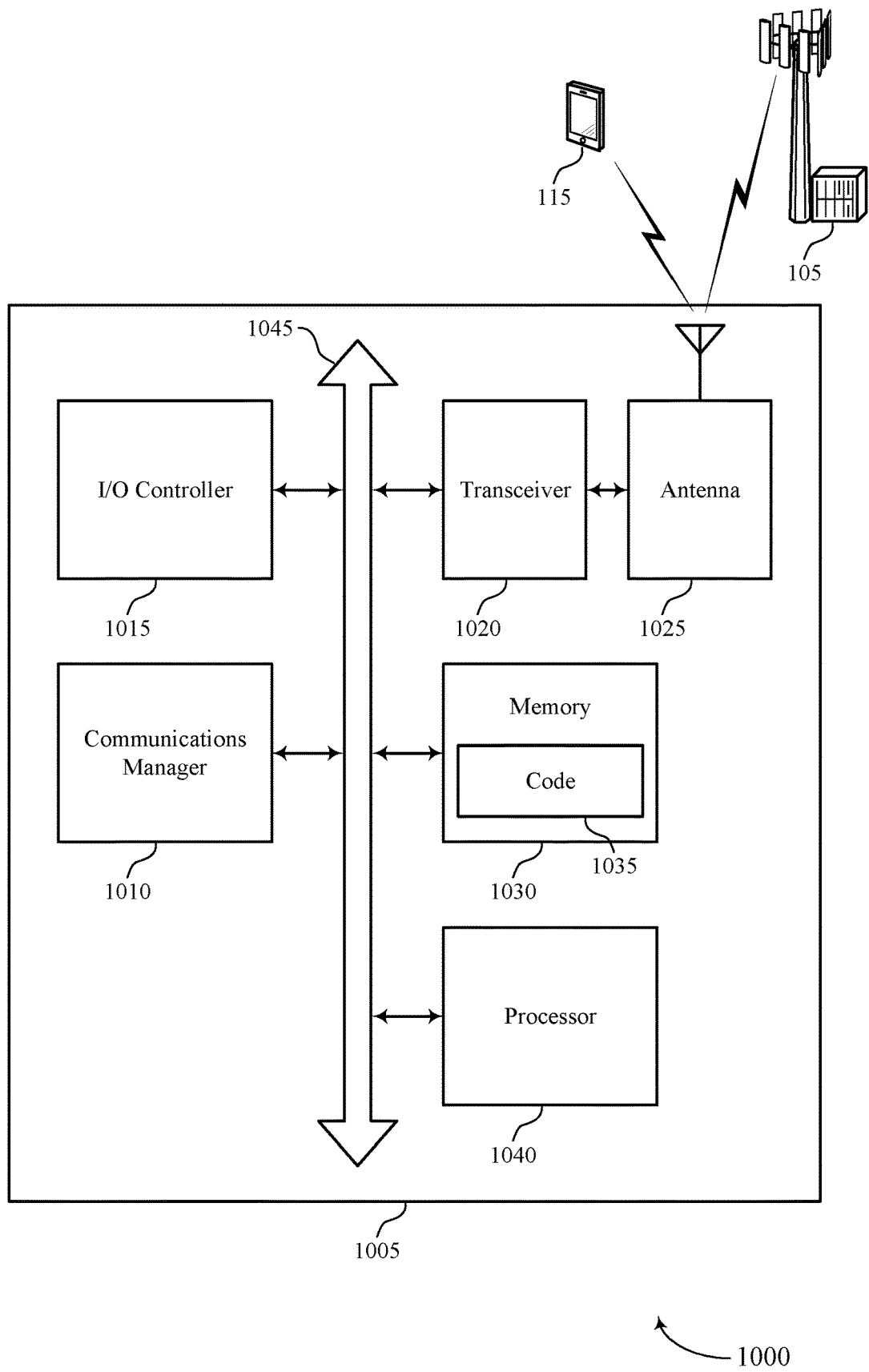
FIG. 10 shows a diagram of a system including a device that supports enhanced CA management in accordance with aspects of the present disclosure.

FIG. 10 shows a diagram of a system 1000 including a device 1005 that supports enhanced CA management in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station, a configuration message indicating an assignment of a first set of CCs to a first CC group and an activation of the first CC group for CA communications between the UE and the base station, receive, from the base station, a first set of physical layer parameters for the first CC group, the first set of physical layer parameters applicable to each of the CCs in the first CC group, and communicate with the base station over the first set of CCs according to the first set of physical layer parameters.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random access memory (RAM) and read only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting enhanced CA management).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
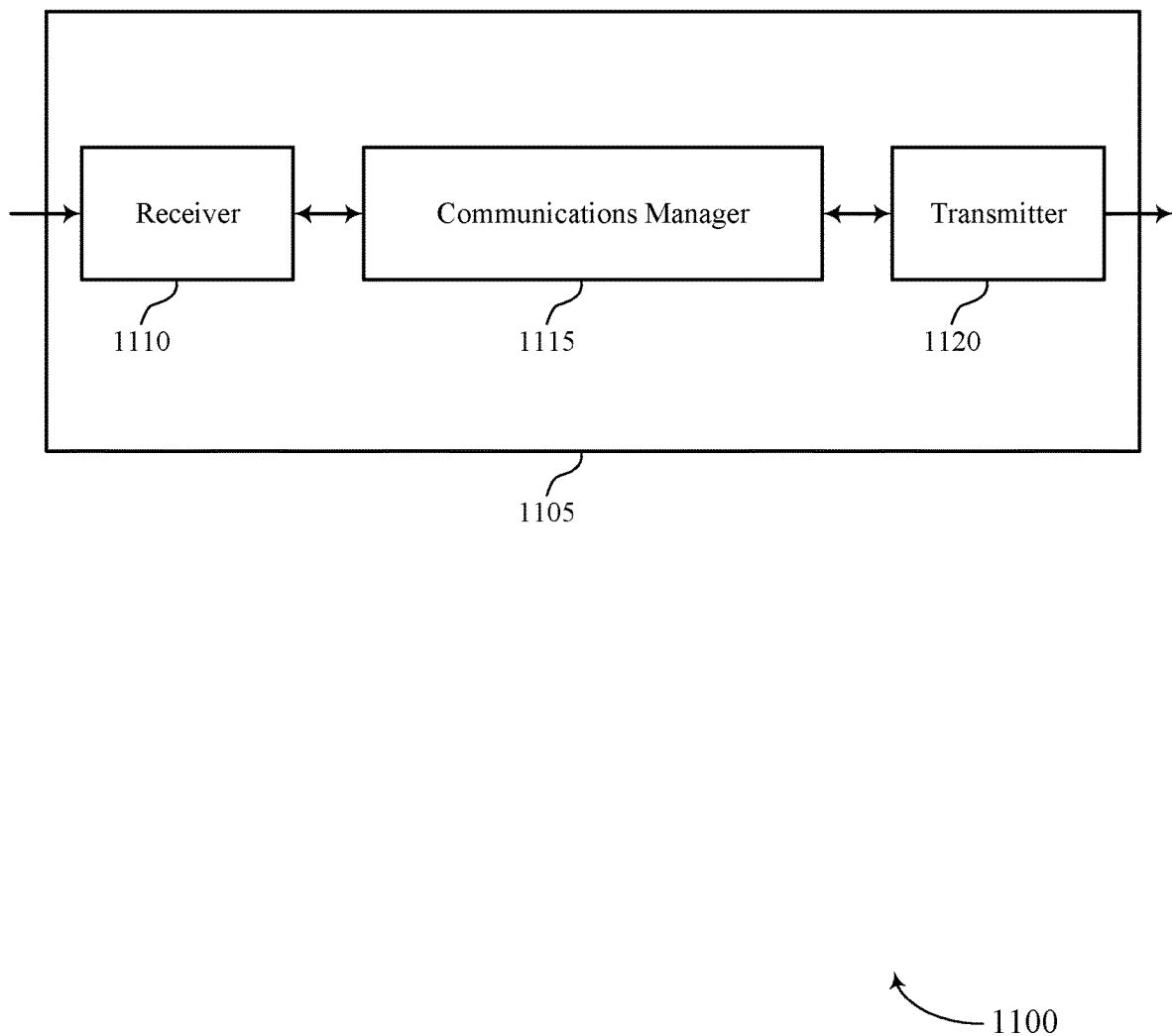
FIGS. 11 and 12 show block diagrams of devices that support enhanced CA management in accordance with aspects of the present disclosure.

FIG. 11 shows a block diagram 1100 of a device 1105 that supports enhanced CA management in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to enhanced CA management, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a UE, an activation message indicating an activation of a first CC group for CA communications between the UE and the base station. The communications manager 1115 may also transmit, to the UE, a first set of physical layer parameters for the first CC group, the first set of physical layer parameters applicable to each of the first set of CCs in the first CC group. The communications manager 1115 may also communicate with the UE over the first set of CCs according to the first set of physical layer parameters. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
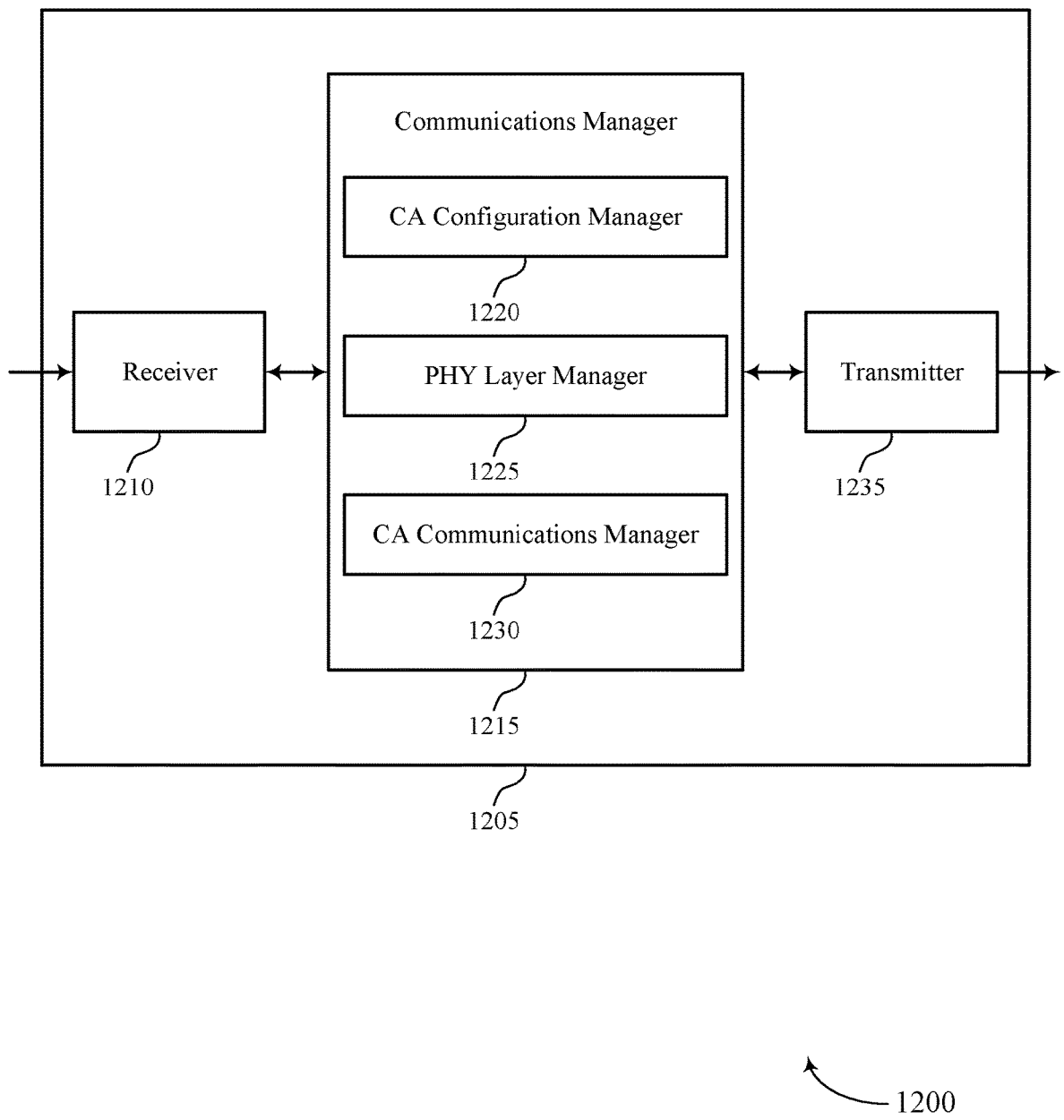

FIG. 12 shows a block diagram 1200 of a device 1205 that supports enhanced CA management in accordance with aspects of the present disclosure. The device 1205 may be an example of aspects of a device 1105 or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to enhanced CA management, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a CA configuration manager 1220, a PHY layer manager 1225, and a CA communications manager 1230. The communications manager 1215 may be an example of aspects of the communications manager 1410 described herein.

The CA configuration manager 1220 may transmit, to a UE, an activation message indicating an activation of the first CC group for CA communications between the UE and the base station.

The PHY layer manager 1225 may transmit, to the UE, a first set of physical layer parameters for the first CC group, the first set of physical layer parameters applicable to each of the first set of CCs in the first CC group.

The CA communications manager 1230 may communicate with the UE over the first set of CCs according to the first set of physical layer parameters.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
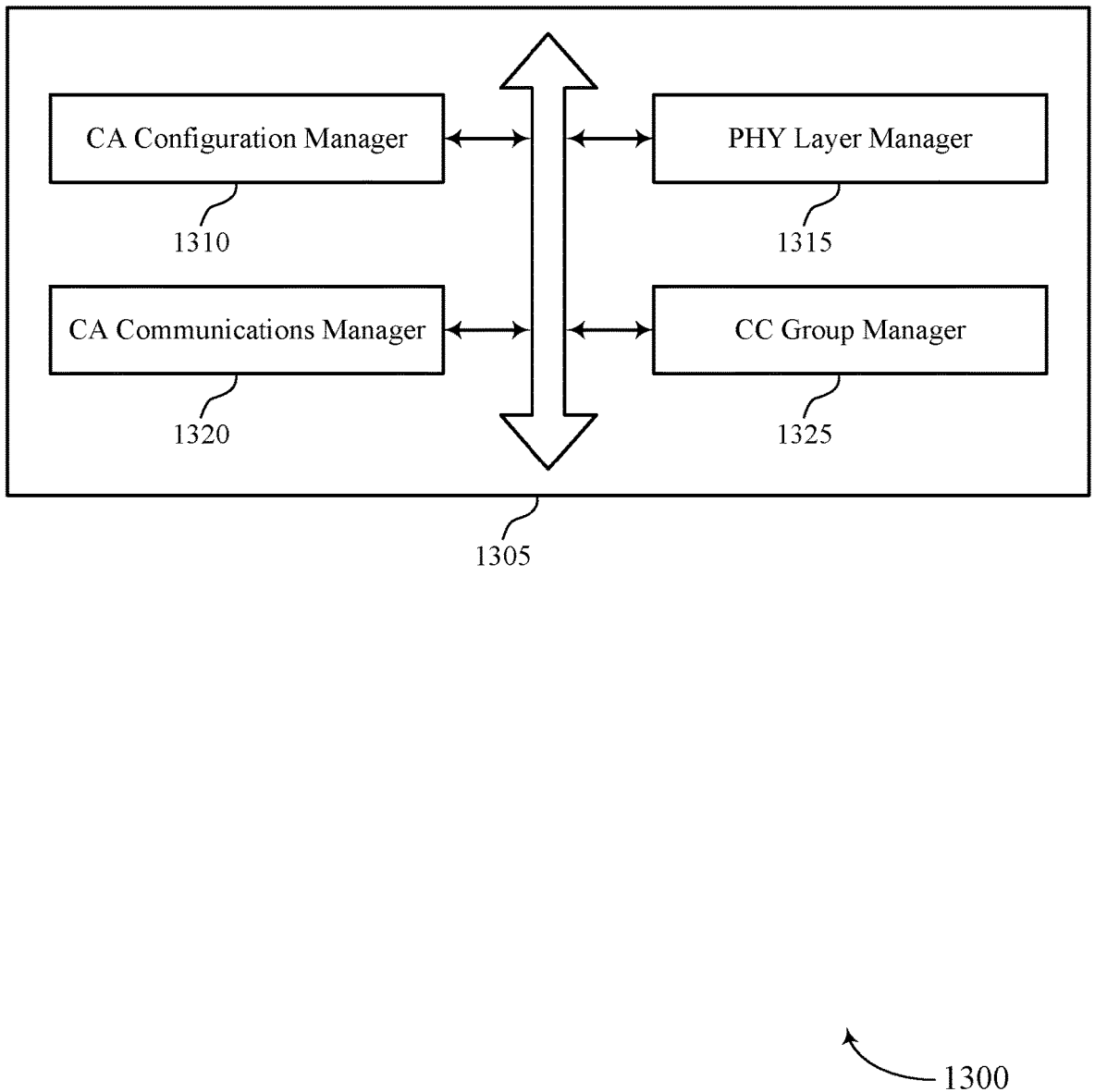
FIG. 13 shows a block diagram of a communications manager that supports enhanced CA management in accordance with aspects of the present disclosure.

FIG. 13 shows a block diagram 1300 of a communications manager 1305 that supports enhanced CA management in accordance with aspects of the present disclosure. The communications manager 1305 may be an example of aspects of a communications manager 1115, a communications manager 1215, or a communications manager 1410 described herein. The communications manager 1305 may include a CA configuration manager 1310, a PHY layer manager 1315, a CA communications manager 1320, and a CC group manager 1325. Each of these modules may communicate, directly or indirectly, with one another (e.g., via one or more buses).

The CA configuration manager 1310 may transmit, to a UE, an activation message indicating an activation of the first CC group for CA communications between the UE and the base station.

In some examples, the CA configuration manager 1310 may configure a set of CCs for CA communications, the set of CCs including the first set of CCs and a second set of CCs. The CA configuration manager 1310 may also transmit a configuration message indicating an assignment of the first set of CCs to the first CC group.

In some cases, a second set of CCs is assigned to a second CC group, and where the configuration message indicates an assignment of the second set of CCs to the second CC group. In some cases, the first set of CCs and the second set of CCs are located within a first frequency band. In some cases, the first set of CCs includes $2^n$ CCs, n being an integer greater than zero. In some cases, the second set of CCs includes $2^n$ CCs, m being an integer greater than zero. In some cases, the first set of CCs are located within a first frequency band and the second set of CCs are located in at least one other frequency band. In some cases, the set of CCs is associated with a set of CC groups, each CC group including $2^n$ CCs of the set of CCs, n being an integer greater than zero.

In some cases, each CC of the first set of CCs is associated with an index, where each CC of the first set of CCs is assigned to the first CC group based on a respective index, and where the activation message includes an indication of at least one index of the first set of CCs.

The PHY layer manager 1315 may transmit, to the UE, a first set of physical layer parameters for the first CC group, the first set of physical layer parameters applicable to each of the first set of CCs in the first CC group.

The CA communications manager 1320 may communicate with the UE over the first set of CCs according to the first set of physical layer parameters. In some examples, the CA communications manager 1320 may measure channel conditions for the first CC group. In some examples, the CA communications manager 1320 may transmit, to the UE, a reconfiguration message for the first CC group and reconfigure radio resource information for the first set of CCs.

In some cases, a subset of the first set of CCs is assigned to a second CC group. In some cases, the second activation message indicates an assignment of the subset of the first set of CCs to the second CC group. In some examples, CA configuration manager 1310 may transmit, to the UE, a second activation message indicating an activation of the second CC group, and CA communications manager 1320 may communicate with the UE over the subset of the first set of CCs based on transmitting the second activation message.

The CC group manager 1325 may assign the first set of CCs to the first CC group. In some examples, the CC group manager 1325 may refrain from assigning the second set of CCs to a CC group.

In some examples, PHY layer manager 1315 may transmit, to the UE, a second set of physical layer parameters for the second CC group, the second set of physical layer parameters applicable to each of the CCs in the second CC group, where the communicating includes communicating with the UE over the second plurality of component carriers according to the second set of physical layer parameters.

Figure 14:
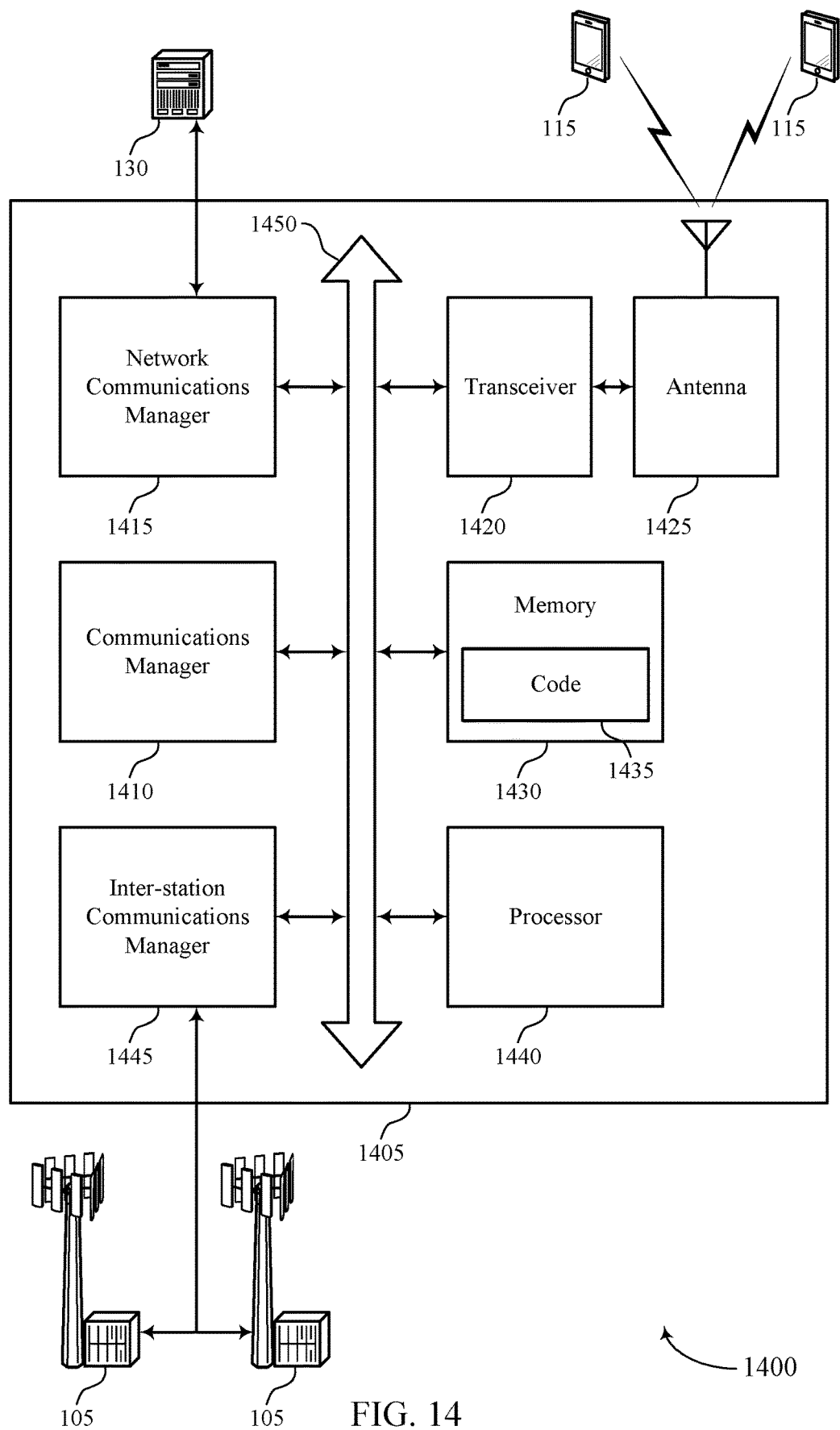
FIG. 14 shows a diagram of a system including a device that supports enhanced CA management in accordance with aspects of the present disclosure.

FIG. 14 shows a diagram of a system 1400 including a device 1405 that supports enhanced CA management in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, to a UE, a configuration message indicating an assignment of a first set of CCs to a first CC group and an activation of the first CC group for CA communications between the UE and the base station, transmit, to the UE, a first set of physical layer parameters for the first CC group, the first set of physical layer parameters applicable to each of the first set of CCs in the first CC group, and communicate with the UE over the first set of CCs according to the first set of physical layer parameters.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device #{device} to perform various functions (e.g., functions or tasks supporting enhanced CA management).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
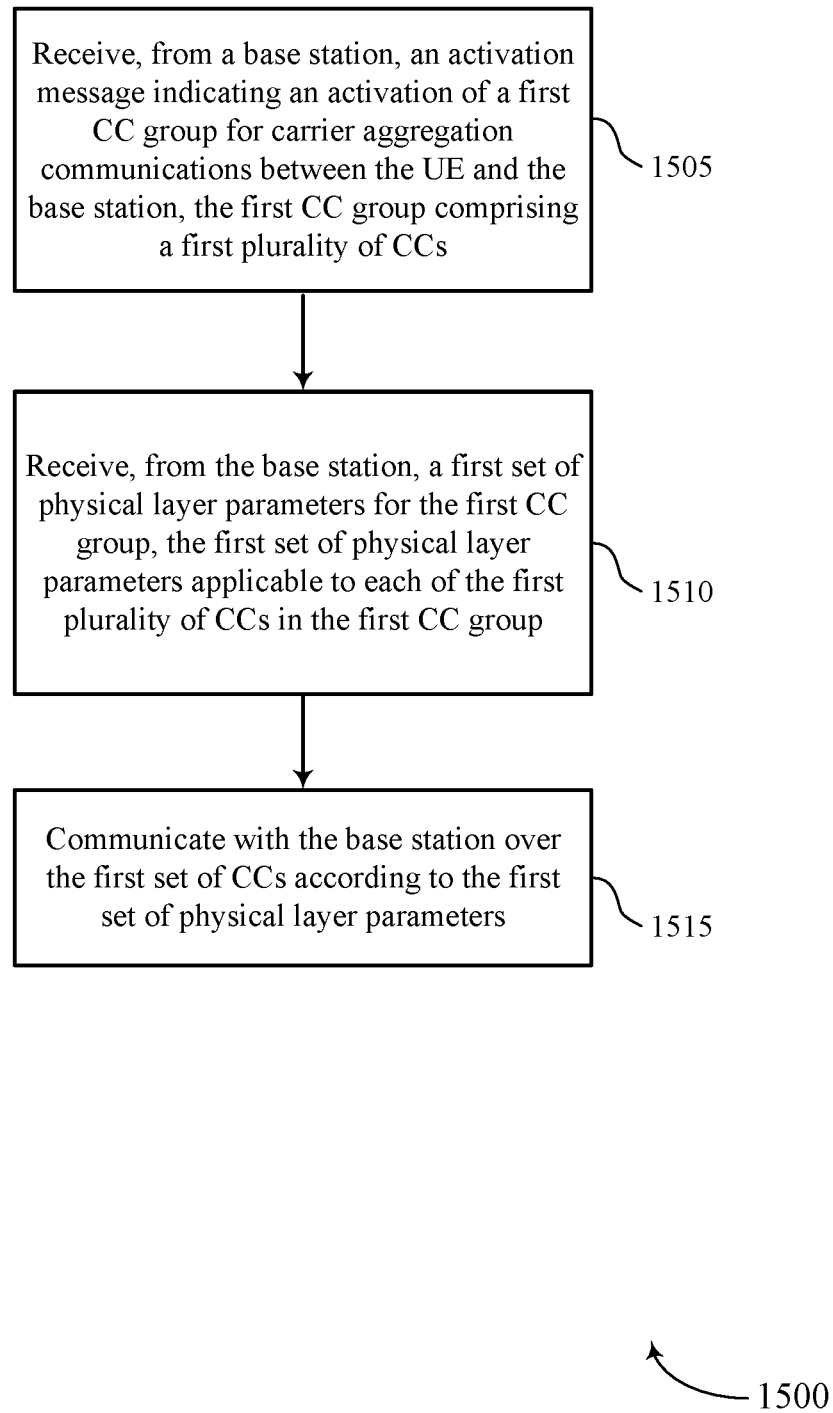
FIGS. 15 and 16 show flowcharts illustrating methods that support enhanced CA management in accordance with aspects of the present disclosure.

FIG. 15 shows a flowchart illustrating a method 1500 that supports enhanced CA management in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1505, the UE may receive, from a base station, an activation message indicating an activation of a first CC group for CA communications between the UE and the base station, the first CC group including a first set of CCs. The operations of 1505 may be performed according to the methods described herein. In some examples, aspects of the operations of 1505 may be performed by a CA configuration manager as described with reference to FIGS. 7 through 10.

At 1510, the UE may receive, from the base station, a first set of physical layer parameters for the first CC group, the first set of physical layer parameters applicable to each of the CCs in the first CC group. The operations of 1510 may be performed according to the methods described herein. In some examples, aspects of the operations of 1510 may be performed by a PHY layer manager as described with reference to FIGS. 7 through 10.

At 1515, the UE may communicate with the base station over the first set of CCs according to the first set of physical layer parameters. The operations of 1515 may be performed according to the methods described herein. In some examples, aspects of the operations of 1515 may be performed by a CA communications manager as described with reference to FIGS. 7 through 10.

Figure 16:
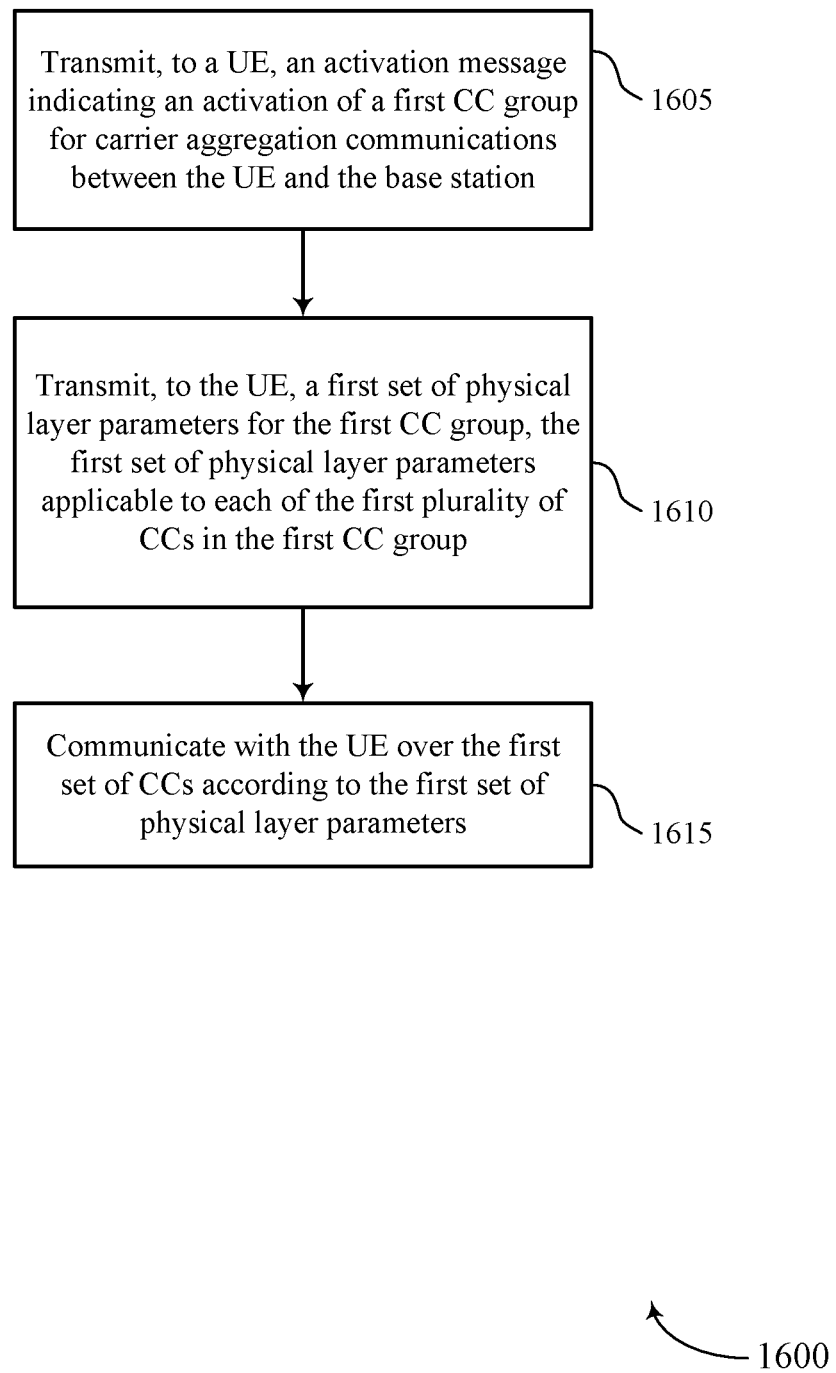

FIG. 16 shows a flowchart illustrating a method 1600 that supports enhanced CA management in accordance with aspects of the present disclosure. The operations of method 1600 may be implemented by a base station 105 or its components as described herein. For example, the operations of method 1600 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 1605, the base station may transmit, to a UE, an activation message indicating an activation of a first CC group for CA communications between the UE and the base station. The operations of 1605 may be performed according to the methods described herein. In some examples, aspects of the operations of 1605 may be performed by a CA configuration manager as described with reference to FIGS. 11 through 14.

At 1610, the base station may transmit, to the UE, a first set of physical layer parameters for the first CC group, the first set of physical layer parameters applicable to each of the first set of CCs in the first CC group. The operations of 1610 may be performed according to the methods described herein. In some examples, aspects of the operations of 1610 may be performed by a PHY layer manager as described with reference to FIGS. 11 through 14.

At 1615, the base station may communicate with the UE over the first set of CCs according to the first set of physical layer parameters. The operations of 1615 may be performed according to the methods described herein. In some examples, aspects of the operations of 1615 may be performed by a CA communications manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The term "cell" may refer to a logical communication entity used for communication between wireless devices (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area (e.g., a sector) over which the logical entity operates.

The term "carrier" refers to a set of radio frequency spectrum resources having a defined physical layer structure for supporting communications over a communication link. For example, a carrier of a communication link may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple CCs.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a network entity, a component carrier group configuration indicating a first component carrier group comprising a first plurality of component carriers grouped together for component carrier management and a second component carrier group comprising a second plurality of component carriers grouped together for component carrier management;
   receiving, from the network entity, an activation message indicating an activation of the first component carrier group for carrier aggregation communications between the UE and the network entity;
   receiving, from the network entity, a control message including an indication of a first physical layer parameter and an identifier of a first component carrier, wherein the identifier is selected from a set of identifiers that correspond to respective component carriers within the first component carrier group and the second component carrier group, and wherein, based at least in part on the identifier and the first component carrier being within the first component carrier group, the first physical layer parameter is applicable to each of the first plurality of component carriers in the first component carrier group, but not applicable to each of the second plurality of component carriers in the second component carrier group; and
   communicating with the network entity over the first plurality of component carriers according to the first physical layer parameter.

2. The method of claim 1, further comprising:
   receiving, from the network entity, a configuration message indicating a configuration of a set of component carriers for carrier aggregation, wherein the set of component carriers comprises the first plurality of component carriers and the second plurality of component carriers, and wherein the configuration message further indicates an assignment of the first plurality of component carriers to the first component carrier group.

3. The method of claim 2, wherein the configuration message comprises an indication identifying that the first plurality of component carriers is assigned to the first component carrier group.

4. The method of claim 2, wherein the first physical layer parameter comprises a transmission mode (TM) parameter, a K0 delay parameter, a K1 delay parameter, a K2 delay parameter, a K3 delay parameter, or a bandwidth part (BWP) configuration parameter, or any combination thereof.

5. The method of claim 1, further comprising:
   receiving, from the network entity, a second activation message activating the second component carrier group, the first plurality of component carriers being a subset of the second plurality of component carriers, wherein the communicating comprises:
   communicating with the network entity over a remaining subset of the second plurality of component carriers based at least in part on receiving the second activation message.

6. The method of claim 1, further comprising:
   receiving, from the network entity, a configuration message indicating an assignment of the second plurality of component carriers to the second component carrier group; and
   receiving, from the network entity, a second activation message activating the second component carrier group, wherein the communicating comprises:
   communicating with the network entity over the second plurality of component carriers based at least in part on receiving the second activation message.

7. The method of claim 6, further comprising:
   receiving, from the network entity, a second physical layer parameter for the second component carrier group, the second physical layer parameter applicable to each of the second plurality of component carriers in the second component carrier group, wherein the communicating comprises:
   communicating with the network entity over the second plurality of component carriers according to the second physical layer parameter.

8. The method of claim 1, wherein each component carrier of the first plurality of component carriers is associated with an index, the method further comprising:
   determining that the first plurality of component carriers is assigned to the first component carrier group based at least in part on a respective index of each of the first plurality of component carriers.

9. The method of claim 8, wherein a configuration message comprises an indication of at least one index of the first plurality of component carriers.

10. The method of claim 1, wherein the first component carrier group is selected from a set of supported groups that is based at least in part on a configured number of component carriers, wherein each group of the set of supported groups comprises 2n component carriers, n being an integer greater than zero.

11. The method of claim 1, further comprising:
receiving, from the network entity, a reconfiguration message; and
reconfiguring radio resource information for the first plurality of component carriers based at least in part on receiving the reconfiguration message.

12. The method of claim 11, wherein reconfiguring the radio resource information comprises:
adding a third component carrier to the first component carrier group; or
removing a fourth component carrier from the first component carrier group.

13. The method of claim 1, further comprising:
deactivating the second component carrier group for carrier aggregation communications between the UE and the network entity based at least in part on receiving the activation message.

14. A method for wireless communication at a network entity, comprising:
transmitting, to a user equipment (UE), a component carrier group configuration indicating a first component carrier group comprising a first plurality of component carriers grouped together for component carrier management and a second component carrier group comprising a second plurality of component carriers grouped together for component carrier management;
transmitting, to the UE, an activation message indicating an activation of the first component carrier group for carrier aggregation communications between the UE and the network entity;
transmitting, to the UE, a control message including an indication of a first physical layer parameter and an identifier of a first component carrier, wherein the identifier is selected from a set of identifiers that correspond to respective component carriers within the first component carrier group and the second component carrier group, and wherein, based at least in part on the identifier and the first component carrier being within the first component carrier group, the first physical layer parameter is applicable to each of the first plurality of component carriers in the first component carrier group, but not applicable to each of the second plurality of component carriers in the second component carrier group; and
communicating with the UE over the first plurality of component carriers according to the first physical layer parameter.

15. The method of claim 14, further comprising:
configuring a set of component carriers for carrier aggregation communications, the set of component carriers comprising the first plurality of component carriers and the second plurality of component carriers, wherein the configuring comprises:
transmitting a configuration message indicating the set of component carriers and an assignment of the first plurality of component carriers to the first component carrier group.

16. The method of claim 15, wherein the second plurality of component carriers is assigned to the second component carrier group, and wherein the configuration message indicates an assignment of the second plurality of component carriers to the second component carrier group.

17. The method of claim 15, wherein the set of component carriers is selected from a plurality of component carrier groups, each component carrier group comprising 2n component carriers of the set of component carriers, n being an integer greater than zero.

18. The method of claim 14, further comprising:
measuring channel conditions for the first component carrier group.

19. The method of claim 14, further comprising:
transmitting, to the UE, a reconfiguration message for the first component carrier group; and
reconfiguring radio resource information for the first plurality of component carriers.

20. The method of claim 14, wherein each component carrier of the first plurality of component carriers is associated with an index, wherein each component carrier of the first plurality of component carriers is assigned to the first component carrier group based at least in part on a respective index, and wherein the activation message comprises an indication of at least one index of the first plurality of component carriers.

21. The method of claim 14, wherein the first plurality of component carriers comprises 2n component carriers, n being an integer greater than zero.

22. The method of claim 14, wherein a configuration message indicates an assignment of a subset of the second plurality of component carriers to the first component carrier group.

23. The method of claim 14, further comprising:
transmitting, to the UE, a second activation message activating the second component carrier group, the first plurality of component carriers being a subset of the second plurality of component carriers, wherein the communicating comprises:
communicating with the UE over a remaining subset of the second plurality of component carriers based at least in part on transmitting the second activation message.

24. The method of claim 14, further comprising:
transmitting, to the UE, a second activation message indicating an activation of the second component carrier group, wherein the communicating comprises:
communicating with the UE over the second plurality of component carriers based at least in part on transmitting the second activation message.

25. The method of claim 14, further comprising:
transmitting, to the UE, a second physical layer parameter for the second component carrier group, the second physical layer parameter applicable to each of the second plurality of component carriers in the second component carrier group, wherein the communicating comprises:
communicating with the UE over the second plurality of component carriers according to the second physical layer parameter.

26. An apparatus for wireless communication at a user equipment (UE), comprising:
a processor;

memory coupled with the processor; and instructions stored in the memory and executable by the processor to cause the apparatus to:

receive, from a network entity, a component carrier group configuration indicating a first component carrier group comprising a first plurality of component carriers grouped together for component carrier management and a second component carrier group comprising a second plurality of component carriers grouped together for component carrier management;

receive, from the network entity, an activation message indicating an activation of the first component carrier group for carrier aggregation communications between the UE and the network entity;

receive, from the network entity, a control message including an indication of a first physical layer parameter and an identifier of a first component carrier, wherein the identifier is selected from a set of identifiers that correspond to respective component carriers within the first component carrier group and the second component carrier group, and wherein, based at least in part on the identifier and the first component carrier being within the first component carrier group, the first physical layer parameter is applicable to each of the first plurality of component carriers in the first component carrier group, but not applicable to each of the second plurality of component carriers in the second component carrier group; and communicate with the network entity over the first plurality of component carriers according to the first physical layer parameter.

27. The apparatus of claim 26, wherein the instructions are further executable by the processor to cause the apparatus to:

deactivate the second component carrier group for carrier aggregation communications between the UE and the network entity based at least in part on receiving the activation message.

28. An apparatus for wireless communication at a network entity, comprising:

a processor;

memory coupled with the processor; and instructions stored in the memory and executable by the processor to cause the apparatus to:

transmit, to a user equipment (UE), a component carrier group configuration indicating a first component carrier group comprising a first plurality of component carriers grouped together for component carrier management and a second component carrier group comprising a second plurality of component carriers grouped together for component carrier management;

transmit, to the UE, an activation message indicating an activation of the first component carrier group for carrier aggregation communications between the UE and the network entity;

transmit, to the UE, a control message including an indication of a first physical layer parameter and an identifier of a first component carrier, wherein the identifier is selected from a set of identifiers that correspond to respective component carriers within the first component carrier group and the second component carrier group, and wherein, based at least in part on the identifier and the first component carrier being within the first component carrier group, the first physical layer parameter is applicable to each of the first plurality of component carriers in the first component carrier group, but not applicable to each of the second plurality of component carriers in the second component carrier group; and communicate with the UE over the first plurality of component carriers according to the first physical layer parameter.

\* \* \* \* \*